United States Patent
Ibrahim et al.

(10) Patent No.: US 12,470,266 B2
(45) Date of Patent: Nov. 11, 2025

(54) METHOD AND APPARATUS FOR CODEBOOK DESIGN FOR CLOSED LOOP OPERATION

(71) Applicant: QUALCOMM Incorporated, San Diego, CA (US)

(72) Inventors: Abdelrahman Mohamed Ahmed Mohamed Ibrahim, San Diego, CA (US); Juergen Cezanne, Ocean Township, NJ (US); Renqiu Wang, San Diego, CA (US); Danlu Zhang, San Diego, CA (US); Naga Bhushan, San Diego, CA (US); Pinar Sen, San Diego, CA (US); Seyong Park, San Diego, CA (US); Yu Zhang, San Diego, CA (US); Muhammad Sayed Khairy Abdelghaffar, San Jose, CA (US); Krishna Kiran Mukkavilli, San Diego, CA (US); Hwan Joon Kwon, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 18/689,322

(22) PCT Filed: Nov. 18, 2021

(86) PCT No.: PCT/CN2021/131428
§ 371 (c)(1),
(2) Date: Mar. 5, 2024

(87) PCT Pub. No.: WO2023/087203
PCT Pub. Date: May 25, 2023

(65) Prior Publication Data
US 2024/0380450 A1    Nov. 14, 2024

(51) Int. Cl.
*H04B 7/0456* (2017.01)

(52) U.S. Cl.
CPC ................. *H04B 7/0456* (2013.01)

(58) Field of Classification Search
CPC ..... H04B 7/0456; H04B 7/0695; H04B 7/088
See application file for complete search history.

(56) References Cited

U.S. PATENT DOCUMENTS 8,923,143 B2 * 12/2014 Gorokhov ............. H04L 1/0026
                                                        370/252
10,749,579 B1    8/2020 Omar et al.
(Continued)

FOREIGN PATENT DOCUMENTS

| CN | 109196821 A | 1/2019 |
| WO | WO-2020126905 A1 | 6/2020 |

OTHER PUBLICATIONS

International Search Report and Written Opinion—PCT/CN2021/131428—ISA/EPO—Jun. 27, 2022.

*Primary Examiner* — Sophia Vlahos
(74) *Attorney, Agent, or Firm* — Holland & Hart LLP

(57) ABSTRACT

Methods, systems, and devices for wireless communications are described. A transmitted may use a closed loop precoder for line-of-sight (LOS) multiple-input multiple-output (MIMO) communications that uses information such as distance feedback or LOS MIMO channel state feedback. A closed loop precoder may be associated with less overhead than a precoder based on full channel knowledge, such as an SVD precoder. A receiver may estimate a channel based on channel state information reference signals transmitted by the transmitter and calculate a spectral efficiency for one or more precoders of a set of precoders associated with the channel for a LOS MIMO mode. The receiver may send feedback to the transmitter that indicates a selected precoder of the set of LOS MIMO precoders based on the calculated (Continued)

spectral efficiencies. The transmitter may precode messages using the reported closed loop precoder.

30 Claims, 22 Drawing Sheets

(56) References Cited

U.S. PATENT DOCUMENTS

| | | |
|---|---|---|
| 2013/0005382 A1 | 1/2013 | Landstrom et al. |
| 2013/0309976 A1 | 11/2013 | Koren et al. |
| 2015/0282122 A1* | 10/2015 | Kim .................. H04B 7/088 370/329 |
| 2016/0337056 A1 | 11/2016 | Frenne et al. |
| 2018/0152325 A1 | 5/2018 | Frank et al. |
| 2020/0106491 A1 | 4/2020 | Wu et al. |
| 2020/0177268 A1 | 6/2020 | Shahmohammadian et al. |
| 2020/0186303 A1 | 6/2020 | Hao et al. |

* cited by examiner

METHOD AND APPARATUS FOR CODEBOOK DESIGN FOR CLOSED LOOP OPERATION

CROSS REFERENCE

The present Application is a 371 national stage filing of International PCT Application No. PCT/CN2021/131428 by IBRAHIM et al. entitled "METHOD AND APPARATUS FOR CODEBOOK DESIGN FOR CLOSED LOOP OPERATION," filed Nov. 18, 2021, which is assigned to the assignee hereof, and which is expressly incorporated by reference in its entirety herein.

FIELD OF TECHNOLOGY

The following relates to wireless communications, including codebook design for closed loop operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

The communications between the wireless devices using the multiple antennas may be referred to as multiple-input multiple-output (MIMO) communications. Some wireless communications systems may support line-of-sight (LOS) multiple-input multiple-output (MIMO) communications. A singular value decomposition (SVD) precoder for LOS MIMO communications based on full channel knowledge acquired by sounding each antenna may provide a high level of accuracy, but may be associated with high overhead, especially if as the number of antennas at the transmitter and the receiver increase.

SUMMARY

The described techniques relate to improved methods, systems, devices, and apparatuses that support codebook design for closed loop operation. Generally, the described techniques provide for the determination and use of closed loop precoders for line-of-sight (LOS) multiple-input multiple-output (MIMO) communications that use information such as distance feedback and/or LOS MIMO channel state feedback. A closed loop precoder that uses information such as distance feedback and/or LOS MIMO channel state feedback may be more accurate than an open loop precoder and may have less overhead than a precoder based on full channel knowledge, such as a singular value decomposition (SVD) precoder. A closed loop LOS MIMO codebook may be based on transmitter and receiver array configurations as well as the distance between the transmitter and the receiver or LOS MIMO channel state feedback. For example, the receiver may estimate a channel based on channel state information (CSI) reference signals (CSI-RSs) transmitted by the transmitter and calculate a spectral efficiency for one or more precoders associated with a LOS MIMO mode. Each precoder may include a first component associated with an estimated phase of the channel and a second component associated with a distance between the transmitter and receiver. The receiver may send feedback to the transmitter that indicates a selected precoder of the set of LOS MIMO precoders based on the calculated spectral efficiencies. For example, the receiver may report a precoder index from the set of LOS MIMO precoders. In some examples, the set of LOS MIMO precoders may be based on a set of distance intervals, where, for a given rank and number of antenna ports, each distance interval has a corresponding precoder. In some cases, the precoders may be based on Slepian sequences (e.g., discrete prolate spheroidal sequences) or a Hermite-Gaussian polynomial, and such techniques may provide a more accurate precoder for LOS MIMO with limited overhead.

The transmitter may transmit a message to the receiver using a precoding scheme based on the reported precoder. The transmitter may select to use the reported closed loop precoder or an open loop precoder based on channel conditions or the receiver and antenna array configurations. For example, the transmitter may select whether to use the reported closed loop precoder or an open loop precoder based on a signal to noise ratio (SNR) of the channel, a signal to interference and noise ratio (SINR) of the channel, an LOS percentage of the channel, an antenna configuration of the receiver, an antenna array configuration of the transmitter, or a combination thereof.

A method for wireless communications at a user equipment (UE) is described. The method may include receiving, from a network entity, a set of multiple channel state information reference signals, estimating a channel based on the set of multiple channel state information reference signals, calculating a spectral efficiency for one or more precoders of a set of precoders associated with the channel for a line-of-sight multiple-input multiple-output mode, where the one or more precoders of the set of precoders include a first component associated with an estimated phase of the channel and a second component associated with a distance between the UE and the network entity, and transmitting, to the network entity, a report indicating a precoder of the set of precoders, the precoder selected based on calculating the spectral efficiency.

An apparatus for wireless communications at a UE is described. The apparatus may include a processor, memory coupled with the processor, and one or more instructions stored in the memory. The one or more instructions may be executable by the processor to cause the apparatus to, based at least in part on the one or more instructions, receive, from a network entity, a set of multiple channel state information reference signals, estimate a channel based on the set of multiple channel state information reference signals, calculate a spectral efficiency for one or more precoders of a set of precoders associated with the channel for a line-of-sight multiple-input multiple-output mode, where the one or more precoders of the set of precoders include a first component associated with an estimated phase of the channel and a second component associated with a distance between the UE and the network entity, and transmit, to the network entity, a report indicating a precoder of the set of precoders, the precoder selected based on calculating the spectral efficiency.

Another apparatus for wireless communications at a UE is described. The apparatus may include means for receiving, from a network entity, a set of multiple channel state information reference signals, means for estimating a channel based on the set of multiple channel state information reference signals, means for calculating a spectral efficiency for one or more precoders of a set of precoders associated with the channel for a line-of-sight multiple-input multiple-output mode, where the one or more precoders of the set of precoders include a first component associated with an estimated phase of the channel and a second component associated with a distance between the UE and the network entity, and means for transmitting, to the network entity, a report indicating a precoder of the set of precoders, the precoder selected based on calculating the spectral efficiency.

A non-transitory computer-readable medium storing code for wireless communications at a UE is described. The code may include instructions executable by a processor to receive, from a network entity, a set of multiple channel state information reference signals, estimate a channel based on the set of multiple channel state information reference signals, calculate a spectral efficiency for one or more precoders of a set of precoders associated with the channel for a line-of-sight multiple-input multiple-output mode, where the one or more precoders of the set of precoders include a first component associated with an estimated phase of the channel and a second component associated with a distance between the UE and the network entity, and transmit, to the network entity, a report indicating a precoder of the set of precoders, the precoder selected based on calculating the spectral efficiency.

Some examples of the method, apparatuses, and non-transitory computer-readable medium described herein may further include operations, features, means, or instructions for selecting the precoder from the set of precoders based on a distance interval associated with the distance between the UE and the network entity, where each precoder of the set of precoders may be associated with a respective distance interval, a respective rank, a respective number of antenna ports at the UE, or a combination thereof.

Some examples of the method, apparatuses, and non-transitory computer-readable medium described herein may further include operations, features, means, or instructions for estimating the estimated phase of the channel associated with the first component based on the distance between the UE and the network entity, a wavelength of the channel, an antenna configuration of the UE, an antenna configuration of the network entity, or a combination thereof.

Some examples of the method, apparatuses, and non-transitory computer-readable medium described herein may further include operations, features, means, or instructions for receiving, from the network entity, an indication of the antenna configuration of the network entity.

Some examples of the method, apparatuses, and non-transitory computer-readable medium described herein may further include operations, features, means, or instructions for selecting the precoder of the set of precoders, where the selected precoder may be associated with a highest calculated spectral efficiency.

In some examples of the method, apparatuses, and non-transitory computer-readable medium described herein, the second component includes one of a Slepian sequence or a Hermite-Gaussian polynomial.

Some examples of the method, apparatuses, and non-transitory computer-readable medium described herein may further include operations, features, means, or instructions for receiving, from the network entity, an indication to initiate the line-of-sight multiple-input multiple-output mode, where calculating the spectral efficiency for each precoder of the set of precoders associated with the channel for the line-of-sight multiple-input multiple-output mode may be based on the indication to initiate the line-of-sight multiple-input multiple-output mode.

Some examples of the method, apparatuses, and non-transitory computer-readable medium described herein may further include operations, features, means, or instructions for transmitting, to the network entity, an indication of an antenna configuration of the UE.

Some examples of the method, apparatuses, and non-transitory computer-readable medium described herein may further include operations, features, means, or instructions for receiving, from the network entity, an indication of the set of precoders for the line-of-sight multiple-input multiple-output mode.

Some examples of the method, apparatuses, and non-transitory computer-readable medium described herein may further include operations, features, means, or instructions for transmitting, to the network entity, an indication of the distance between the UE and the network entity.

Some examples of the method, apparatuses, and non-transitory computer-readable medium described herein may further include operations, features, means, or instructions for receiving, from the network entity, one or more positioning reference signals, where the indication of the distance between the UE and the network entity may be based on the one or more positioning reference signals.

Some examples of the method, apparatuses, and non-transitory computer-readable medium described herein may further include operations, features, means, or instructions for transmitting, to the network entity, a sounding reference signal indicating the distance between the UE and the network entity.

Some examples of the method, apparatuses, and non-transitory computer-readable medium described herein may further include operations, features, means, or instructions for receiving, from the network entity, a message precoded using the precoder indicated by the report.

A method for wireless communications at a network entity is described. The method may include transmitting, to a UE, a set of multiple channel state information reference signals, receiving, from the UE, a report indicating a precoder associated with a channel for a line-of-sight multiple-input multiple-output mode, where the precoder includes a first component associated with a phase of the channel and a second component associated with a distance between the UE and the network entity, and transmitting, to the UE, a message precoded using a precoding scheme for the line-of-sight multiple-input multiple-output mode based on the report.

An apparatus for wireless communications at a network entity is described. The apparatus may include a processor, memory coupled with the processor, and one or more instructions stored in the memory. The one or more instructions may be executable by the processor to cause the apparatus to, based at least in part on the one or more instructions, transmit, to a UE, a set of multiple channel state information reference signals, receive, from the UE, a report indicating a precoder associated with a channel for a lineof-sight multiple-input multiple-output mode, where the precoder includes a first component associated with a phase of the channel and a second component associated with a distance between the UE and the network entity, and transmit, to the UE, a message precoded using a precoding scheme for the line-of-sight multiple-input multiple-output mode based on the report.

Another apparatus for wireless communications at a network entity is described. The apparatus may include means for transmitting, to a UE, a set of multiple channel state information reference signals, means for receiving, from the UE, a report indicating a precoder associated with a channel for a line-of-sight multiple-input multiple-output mode, where the precoder includes a first component associated with a phase of the channel and a second component associated with a distance between the UE and the network entity, and means for transmitting, to the UE, a message precoded using a precoding scheme for the line-of-sight multiple-input multiple-output mode based on the report.

A non-transitory computer-readable medium storing code for wireless communications at a network entity is described. The code may include instructions executable by a processor to transmit, to a UE, a set of multiple channel state information reference signals, receive, from the UE, a report indicating a precoder associated with a channel for a line-of-sight multiple-input multiple-output mode, where the precoder includes a first component associated with a phase of the channel and a second component associated with a distance between the UE and the network entity, and transmit, to the UE, a message precoded using a precoding scheme for the line-of-sight multiple-input multiple-output mode based on the report.

Some examples of the method, apparatuses, and non-transitory computer-readable medium described herein may further include operations, features, means, or instructions for selecting the precoding scheme as one of a closed loop precoding scheme or an open loop precoding scheme based on a signal to noise ratio of the channel, a signal to interference and noise ratio of the channel, a line-of-sight percentage of the channel, an antenna configuration of the UE, an antenna configuration of the network entity, or a combination thereof.

In some examples of the method, apparatuses, and non-transitory computer-readable medium described herein, transmitting the message precoded using the closed loop precoding scheme may include operations, features, means, or instructions for transmitting the message precoded using the precoder received from the UE.

Some examples of the method, apparatuses, and non-transitory computer-readable medium described herein may further include operations, features, means, or instructions for estimating the line-of-sight percentage of the channel and selecting the precoding scheme as the closed loop precoding scheme based on the line-of-sight percentage of the channel.

Some examples of the method, apparatuses, and non-transitory computer-readable medium described herein may further include operations, features, means, or instructions for estimating the signal to noise ratio of the channel or the signal to interference and noise ratio of the channel and selecting the precoding scheme as the closed loop precoding scheme based on the signal to noise ratio of the channel or the signal to interference and noise ratio of the channel.

Some examples of the method, apparatuses, and non-transitory computer-readable medium described herein may further include operations, features, means, or instructions for receiving, from the UE, an indication of the antenna configuration of the UE and selecting the precoding scheme as the closed loop precoding scheme based on the indication of the antenna configuration of the UE.

Some examples of the method, apparatuses, and non-transitory computer-readable medium described herein may further include operations, features, means, or instructions for receiving, from the UE, an indication of the distance between the UE and the network entity.

Some examples of the method, apparatuses, and non-transitory computer-readable medium described herein may further include operations, features, means, or instructions for transmitting, to the UE, one or more positioning reference signals, where the indication of the distance between the UE and the network entity may be based on the one or more positioning reference signals.

Some examples of the method, apparatuses, and non-transitory computer-readable medium described herein may further include operations, features, means, or instructions for receiving, from the UE, a sounding reference signal indicating the distance between the UE and the network entity.

In some examples of the method, apparatuses, and non-transitory computer-readable medium described herein, the second component includes one of a Slepian sequence or a Hermite-Gaussian polynomial.

DETAILED DESCRIPTION

Figure 1:
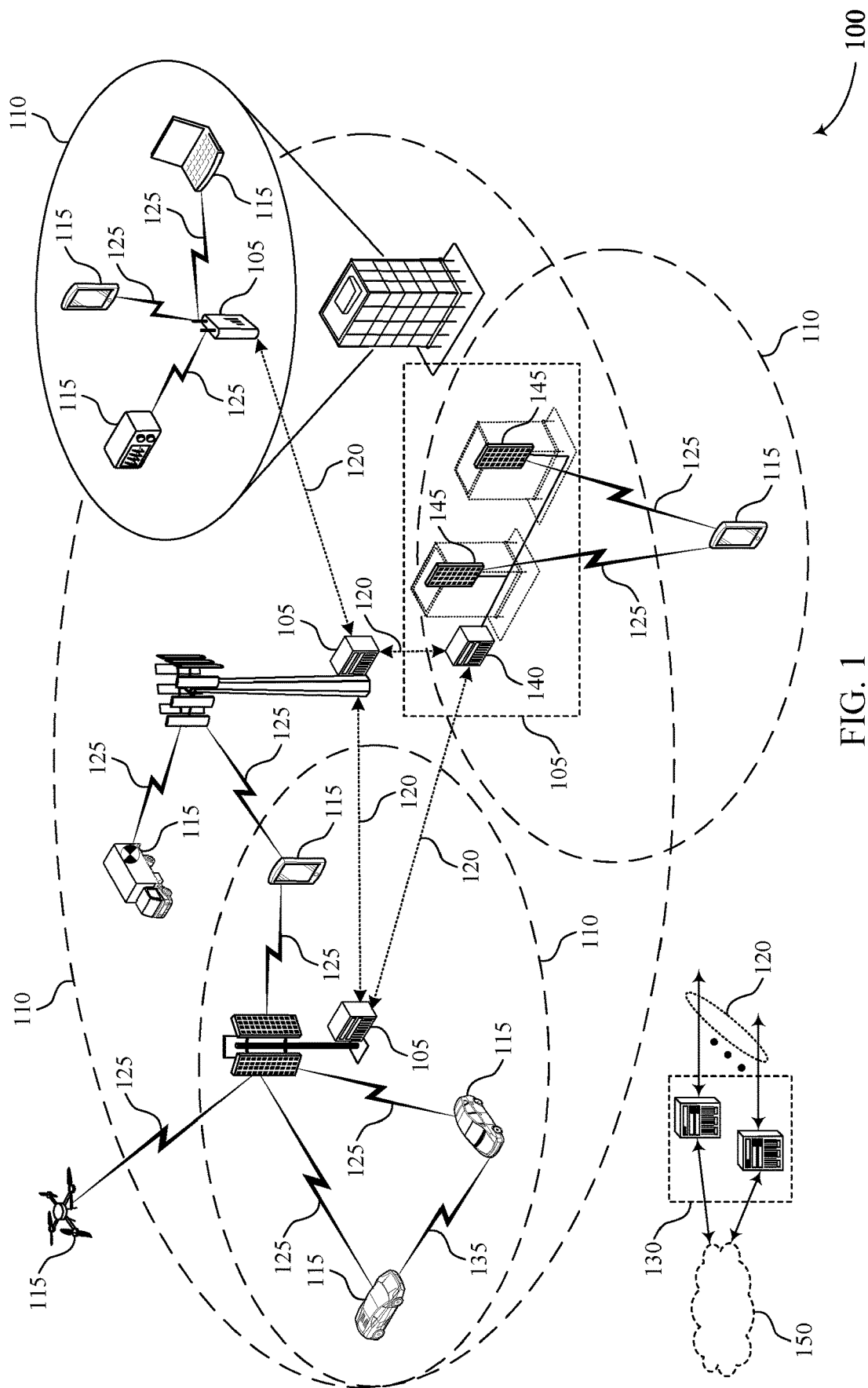
FIG. 1 illustrates an example of a wireless communications system that supports codebook design for closed loop operation in accordance with aspects of the present disclosure.

Some wireless communications systems may support communications between wireless devices (for example, user equipment (UEs) and base stations) using multiple antennas (for example, multiple antennas at a transmitter and multiple antennas at a receiver). The communications between the wireless devices using the multiple antennas may be referred to as multiple-input multiple-output (MIMO) communications. Some wireless communications systems may also support line-of-sight (LOS) MIMO communications. LOS MIMO refers to MIMO communications on a channel with a strong LOS component (e.g., LOS between two stationary devices with few obstructions) relative to non-LOS components. In LOS MIMO, as distance increases, the spectral efficiency (e.g., an amount of layers that can be spatially multiplexed) generally decreases. LOS MIMO provides high multiplexing gain when: the distance between the transmitter and receiver arrays is below a threshold distance (which depends on apertures of transmitter and receiver arrays and the carrier frequency); and the communications use an accurate precoder. In some cases, an open loop precoder, which refers to a precoder generated without feedback from a receiver, may not provide a sufficient level of accuracy for LOS MIMO. A singular value decomposition (SVD) precoder based on full channel knowledge acquired by sounding each antenna may provide a high level of accuracy, but may be associated with high overhead, especially if the transmitter and the receiver each include a large number of antennas.

Various aspects of the present disclosure relate to the determination and use of closed loop precoders for LOS MIMO that use information such as distance feedback and/or LOS MIMO channel state feedback. A closed loop precoder that uses information such as distance feedback and/or LOS MIMO channel state feedback may be more accurate than an open loop precoder and may have less overhead than a precoder based on full channel knowledge, such as an SVD precoder. A closed loop LOS MIMO codebook may be based on transmitter and receiver array configurations and the distance between the transmitter and the receiver or LOS MIMO channel state feedback. For example, the receiver may estimate a channel based on channel state information reference signals transmitted by the transmitter and calculate a spectral efficiency for one or more precoders of a set of precoders associated with the channel for a LOS MIMO mode. Each precoder may include a first component associated with an estimated phase of the channel and a second component associated with a distance between the transmitter and receiver. The receiver may send feedback to the transmitter that indicates a selected precoder of the set of LOS MIMO precoders based on the calculated spectral efficiencies. For example, the receiver may report a precoder index from the set of LOS MIMO precoders. In some examples, the set of LOS MIMO precoders may be based on a set of distance intervals, where there is a corresponding precoder for each distance interval for a given rank and number of antenna ports. In some cases, the precoders may be based on Slepian sequences (e.g., discrete prolate spheroidal sequences) or a Hermite-Gaussian polynomial, and such techniques enable a more accurate precoder for LOS MIMO but with limited overhead.

The transmitter may transmit a message to the receiver using a precoding scheme based on the reported precoder. The transmitter may select to use the reported closed loop precoder or an open loop precoder based on channel conditions or the receiver and antenna array configurations. For example, the transmitter may select whether to use the reported closed loop precoder or an open loop precoder based on a signal to noise ratio (SNR) of the channel, a signal to interference and noise ratio (SINR) of the channel, an LOS percentage of the channel, an antenna configuration of the receiver, an antenna array configuration of the transmitter, or a combination thereof.

Aspects of the disclosure are initially described in the context of wireless communications systems. Examples of processes and signaling techniques that support LOS MIMO precoding based on closed loop operation are then described. Aspects of the disclosure are further illustrated by and described with reference to apparatus diagrams, system diagrams, and flowcharts that relate to codebook design for closed loop operation.

FIG. 1 illustrates an example of a wireless communications system 100 that supports codebook design for closed loop operation in accordance with aspects of the present disclosure. The wireless communications system 100 may include one or more base stations 105 (e.g., network entities), one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest SNR, or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some implementations, wireless devices in wireless communications system 100 may support one or more types of MIMO communications. For instance, the wireless devices may communicate using LOS MIMO, which may refer to MIMO communications on a channel with a clear LOS (for example, a channel with an LOS measurement satisfying a threshold). The wireless devices may also communicate using massive MIMO (MMIMO), which may refer to MIMO communications using a large number of antennas without a clear LOS (for example, with a non-LOS (NLOS) measurement satisfying a threshold). A channel used for MIMO communications may be modeled using, for example, a Rician channel model. The Rician channel model is shown in Equations 1-4 below, in which H refers to a characteristic of the channel. $H_{LOS}$ may be an LOS component of the channel, and $H_{NLOS}$ may be an NLOS component of the channel. CDL refers to cluster delay line, and TDL refers to tapped delay line. The LOS component may be deterministic, and the NLOS component may be based on reflections and scattering from an environment and, in some cases, may be random. The value of a may indicate an impact of the LOS component on the channel (for example, LOS percentage=$a^2$), and the value of b may indicate an impact of the NLOS component on the channel.

$$H = aH_{LOS} + bH_{NLOS} \quad (1)$$

$$H_{LOS} = \frac{\exp\left(-i2\pi \frac{r_{jk}}{\lambda}\right)}{\frac{r_{jk}}{\lambda}} \quad (2)$$

$$H_{NLOS} \in \{i.i.d.\text{Rayleigh}, CDL-x, TDL-x\} \quad (3)$$

$$a^2 + b^2 = 1 \quad (4)$$

LOS MIMO may include communications using circular, one-dimensional, or two-dimensional antenna arrays, and MMIMO may include communications using one-dimensional or two-dimensional antenna arrays. LOS MIMO may also include communications on a channel with a channel matrix associated with a strong LOS component (for example, a>>b), and MMIMO may include communications on a channel with a weak LOS component (for example, a<b). In some examples, a transmitter may precode signals for LSM MIMO or MMIMO communications using a SVD-based precoder. For LOS MIMO, the SVD-based precoder may be implicit and may be based on a special structure of a channel (for example, with limited to no channel state feedback), and, for MMIMO, the transmitter may compute or construct the SVD-based precoder using explicit channel state feedback.

A transmitter (e.g., a base station 105) may precode messages using a closed loop LOS MIMO precoding scheme, as described herein. A closed loop LOS MIMO codebook may be based on transmitter and receiver array configurations and the distance between the transmitter and the receiver or LOS MIMO channel state feedback. For example, the receiver (e.g., a UE 115) may estimate a channel based on channel state information reference signals transmitted by the base station 105, and the UE 115 may calculate a spectral efficiency for one or more precoders of a set of precoders associated with the channel for a LOS MIMO mode. In some examples, the base station 105 may transmit the set of precoders to the UE 115. Each precoder may include a first component associated with an estimated phase of the channel and a second component associated with a distance between the base station 105 and UE 115. The UE 115 may report feedback to the base station 105 that indicates a selected precoder of the set of LOS MIMO precoders based on the calculated spectral efficiencies. For example, the UE 115 may report a precoder index from the set of LOS MIMO precoders. In some examples, the set of LOS MIMO precoders may be based on a set of distance intervals, where there is a corresponding precoder for each distance interval between the UE 115 and the base station 105 for a given rank and number of antenna ports. In some cases, the precoders may be based on Slepian sequences (e.g., discrete prolate spheroidal sequences) or a Hermite- Gaussian polynomial. The base station 105 may transmit a message to the UE 115 using a precoding scheme based on the reported precoder.

In some examples, the UE 115 may report distance information and information regarding the antenna array configuration of the UE 115 to the base station 105, and the base station 105 may determine a closed loop precoder based on the reported distance information and information regarding the UE 115 antenna array configuration. For example, the base station 105 may determine the precoder using a Slepian based precoder or a Hermite-Gaussian based precoder, as described herein, using the reported distance and UE 115 antenna array configuration information. In some examples, the UE 115 may determine the distance based on received positioning reference signals transmitted by the base station 105. In some examples, the base station 105 may estimate the distance between the UE 115 and the base station 105 based on sounding reference signal(s) transmitted by the UE 115. Accordingly, in some examples, the base station 105 may determine a precoder based on the estimated distance and information received from the UE 115 corresponding to the UE 115 antenna array configuration.

The base station 105 may select to use the reported closed loop precoder or an open loop precoder, as described herein, based on channel conditions or the receiver and antenna array configurations. For example, the transmitter may select whether to use the reported closed loop precoder or an open loop precoder based on an estimated SNR of the channel, an estimated SINR of the channel, an estimated LOS percentage of the channel, an antenna configuration of the receiver, an antenna array configuration of the transmitter, or a combination thereof.

Figure 2:
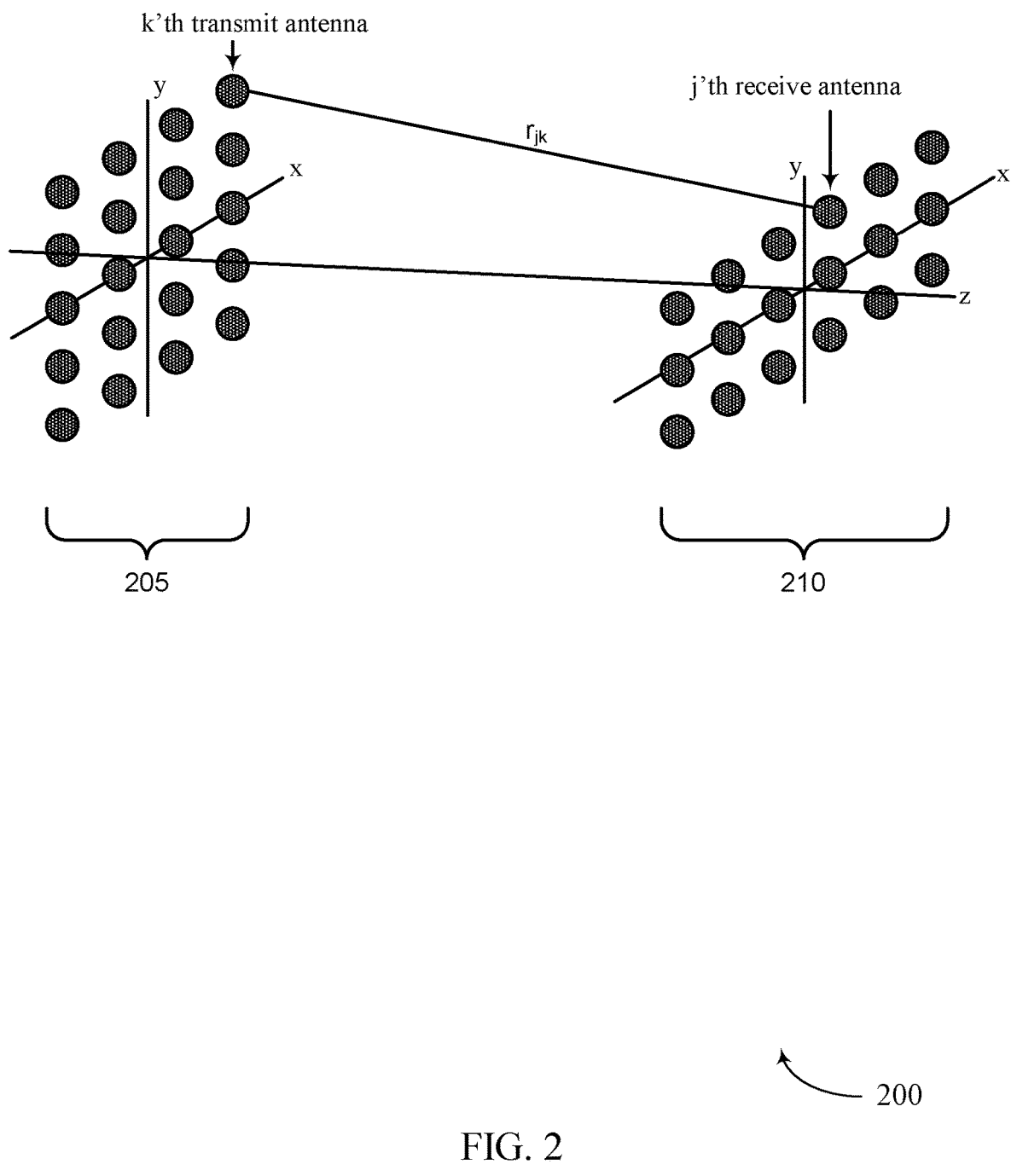
FIG. 2 illustrates an example of antenna arrays at a transmitter and a receiver used for multiple-input multiple-output (MIMO) communications in accordance with aspects of the present disclosure.

FIG. 2 illustrates an example of antenna arrays 200 at a transmitter and a receiver used for MIMO communications. In some implementations, a structure of a LOS MIMO channel may be exploited to achieve high multiplexing gain. Multiplexing gain may refer to a gain associated with MIMO communications (for example, compared to single-antenna communications). The LOS MIMO gain may decrease as distance between a transmitter and receiver increases. In FIG. 2, the LOS MIMO gain may decrease as $r_{jk}$ decreases, in which $r_{jk}$ corresponds to a distance between a k'th transmit antenna at the first antenna array 205 and a j'th receive antenna at the second antenna array 210. In some examples, multiplexing gain may vanish at $10000\lambda$ (for example, in which $1000\lambda=85$ m for a 3.5 GHz channel). A maximum distance in which a transmitter may achieve LOS MIMO gain may depend on a product of transmit and receive antenna apertures. The aperture of an antenna array may correspond to a width of the antenna array. A spectral efficiency factor of an antenna array having a number of antennas at the receiver $N_r$ may be a ratio between an achievable spectral efficiency and a single-mode capacity (for example, $\log_2(1+N_r(SNR))$), and the spectral efficiency factor may be an indicator of a spatial multiplexing gain.

In some aspects, LOS MIMO may provide a high multiplexing gain under one or more conditions. For instance, LOS MIMO may provide a high multiplexing gain in the example that a distance between transmit and receive antenna arrays fail to exceed a threshold that depends on apertures of the transmit and receive antennas and a carrier frequency. In addition, LOS MIMO may provide a high multiplexing gain in the example that a transmitter utilizes an accurate LOS MIMO precoder. An accurate LOS MIMO precoder may be based on channel knowledge at the transmitter, distance feedback to the transmitter, and a misalignment compensation (for example, compensation for misalignment between transmit and receive antenna arrays). In some examples, multiple deployment scenarios may have different constraints or uses for LOS MIMO. For instance, LOS MIMO may be used for communications in a backhaul link between a base station 105 and a relay (for example, an integrated access and backhaul (IAB), smart repeater, customer-provided equipment (CPE)). Additionally or alternatively, LOS MIMO may be used for communications in an access link between a base station 105 or relay and a UE 115.

As mentioned, a transmitter may use feedback from a receiver (for example, channel state feedback) to construct a suitable precoder for precoding signals for transmission to the receiver. Such a precoder may be referred to as a closed loop precoder. In some examples, however, the feedback used to construct the closed loop precoder may incur overhead in a wireless communications system. Thus, in some implementations, a transmitter may use an open loop precoder for LOS MIMO communications. For instance, the transmitter may use the open loop precoder in the example that the transmitter is unable to accurately estimate a channel to derive a precoder. The open loop precoder may refer to a precoder constructed without feedback from a receiver. The transmitter may use transmit and receive array configurations at the transmitter and the receiver to construct the open loop precoder (for example, the transmitter may consider semi-open loop operation in the example that transmit and receive array configurations are known). Because the transmitter may use the transmit and receive array configurations to determine the open loop precoder, the open loop precoder may be referred to as a semi-open loop precoder. The semi-open loop precoder may differ from a fully-open loop precoder since the fully-open loop precoder may be selected with no knowledge at the transmitter. It may be challenging to exploit LOS MIMO gain for fully-open loop operation without knowledge about transmit and receive array configurations (for example, since there may be no universal precoder).

The transmitter may utilize the open loop precoder for precoding signals for transmission to the receiver in the example that the receiver has little or no sounding capability or capability to transmit sounding reference signals (SRSs) (for example, a smart repeater with limited mobile terminated capabilities). In addition, the transmitter may utilize the open loop precoder in the example that transmit and receive arrays at the transmitter and the receiver are aligned or in the example that the transmitter is capable of misalignment estimation and compensation (for example, the transmitter is able to estimate a misalignment between the transmit and receive arrays and compensate for the misalignment). Further, the transmitter may utilize the open loop precoder to avoid high sounding overhead for large arrays (for example, receive arrays). For instance, the transmitter may utilize the open loop precoder in the example that an overhead for indicating a misalignment estimation is less than a sounding overhead. The transmitter may also utilize the open loop precoder for low-complexity operation (for example, to avoid the complexity associated with constructing a precoder based on feedback from the receiver).

In some examples, as described herein, the transmitter may utilize a closed loop precoder for precoding signals for transmission to the receiver that is not based on full channel sounding. For example, a closed loop LOS MIMO codebook may be based on transmitter and receiver array configurations and the distance between the transmitter and the receiver or LOS MIMO channel state feedback. Closed loop LOS MIMO precoders based on transmitter and receiver array configurations and the distance between the transmitter and the receiver or LOS MIMO channel state feedback may perform similarly to SVD precoders, but may be associated with less overhead. For example, the receiver may estimate a channel based on channel state information reference signals transmitted by the transmitter, and the receiver may calculate a spectral efficiency for one or more precoders of a set of precoders associated with the channel for a LOS MIMO mode. The receiver may report feedback to the transmitter that indicates a selected precoder of the set of LOS MIMO precoders based on the calculated spectral efficiencies. In some examples, the receiver may report distance information and information regarding the antenna array configuration of the receiver to the transmitter, and the transmitter may determine a closed loop precoder based on the reported distance information and information regarding the receiver antenna array configuration.

Figure 3:
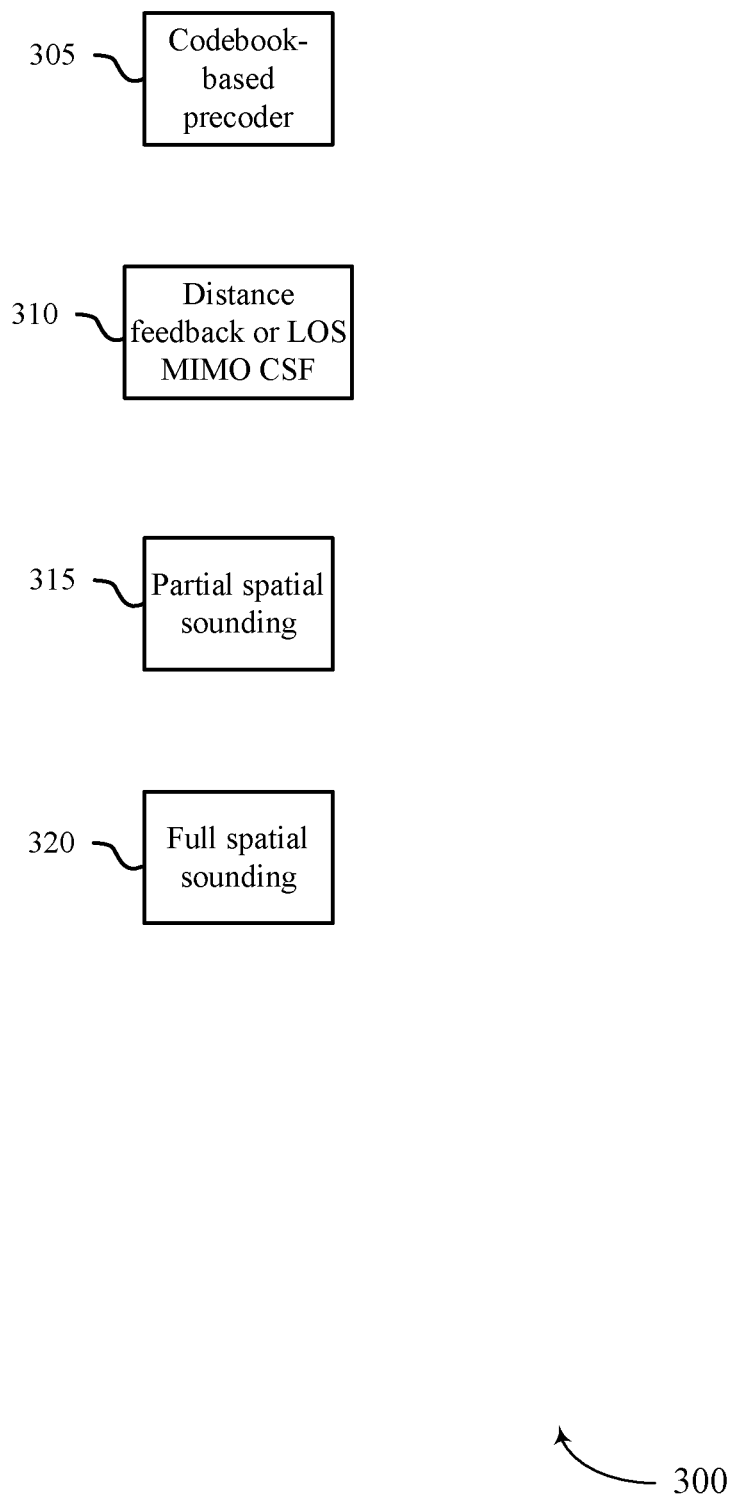
FIG. 3 illustrates an example of different approaches for generating a precoder for MIMO communications in accordance with aspects of the present disclosure.

FIG. 3 illustrates an example of different approaches 300 for generating a precoder for MIMO communications in accordance with aspects of the present disclosure. The different approaches may be provided in order of increasing signaling overhead. In a first approach 305, a transmitter may utilize no feedback to determine a codebook-based precoder based on a semi-open loop codebook. In a second approach 310, the transmitter may utilize distance feedback or LOS MIMO channel state feedback to determine a codebook based precoder. In a third approach 315, the transmitter may utilize partial spatial sounding to construct a precoder. In a fourth approach 320, the transmitter may utilize full spatial sounding to construct a precoder.

In wireless communications system 100, a transmitter may utilize a codebook-based precoder to exploit an LOS MIMO gain. An optimal precoder may be an SVD-based precoder based on full channel knowledge. However, the overhead to construct the optimal precoder may be high, so a transmitter in wireless communications system 100 may utilize sub-optimal precoders for MIMO communications, and the transmitter may derive the sub-optimal precoders based on limited feedback. As mentioned, the codebook-based precoder may be useful for scenarios in which a transmitter has access to limited feedback (for example, no sounding or limited sounding capability of a receiver, aligned transmit and receive antenna arrays or nodes with misalignment estimation or compensation capabilities, or low mobility scenarios in which receiver orientation is semi-static).

A semi-open loop precoding codebook may be defined for a transmitter operating in an LOS MIMO mode, and the transmitter (for example, a base station 105, a relay, or a UE 115) may select a precoder based on configurations of transmit and receive antenna arrays at the transmitter and a receiver. For one-dimensional uniform linear arrays (ULAs) at the transmitter and the receiver, the transmitter may utilize a Legendre precoder in the example that $N_r \geq N_t$ (where $N_r$ refers to the number of antennas at the receiver and $N_t$ refers to the number of antennas at the transmitter), and the transmitter may utilize a block-DFT precoder in the example that $N_r < N_t$. For two-dimensional uniform rectangular arrays (URAs) at the transmitter and the receiver, each axis of the URAs may be seen as a one-dimensional array. For instance, the two-dimensional URAs may correspond to an $N_{T_x} \times N_{T_y}$ array at the transmitter (where $N_{T_x}$ refers to the number of transmitter antennas in the x direction and $N_{T_y}$ refers to the number of transmitter antennas in the y direction) and an $N_{R_x} \times N_{R_y}$ array at the receiver (where $N_{R_x}$ refers to the number of transmitter antennas in the x direction and $N_{R_y}$ refers to the number of transmitter antennas in the y direction). Further, a Kronecker product of two one-dimensional arrays may correspond to a two-dimensional array. Thus, the transmitter may construct a two-dimensional precoder using a Kronecker product of $V_x$ and $V_y$. $V_x$ may be a one-dimensional precoder for a $N_{R_x} \times N_{T_x}$ channel, and $V_y$ may be a one-dimensional precoder for a $N_{R_y} \times N_{T_y}$ channel.

Figure 4:
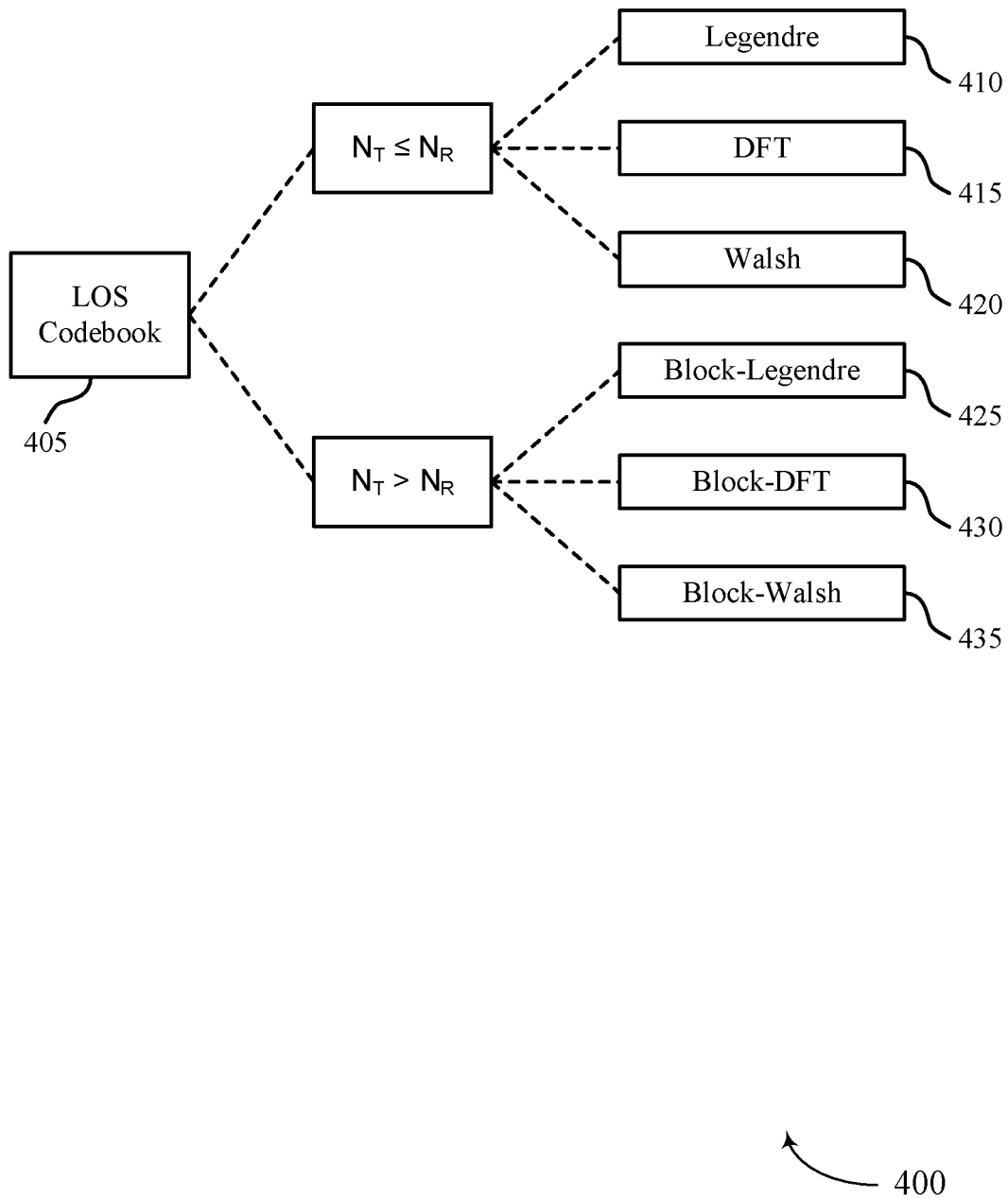
FIG. 4 illustrates an example of precoder candidates for line-of-sight (LOS) MIMO in accordance with aspects of the present disclosure.

FIG. 4 illustrates an example of precoder candidates 400 for LOS MIMO (for example, including precoders based on Legendre polynomials) in accordance with aspects of the present disclosure. Each of the precoder candidates may be an example of a codebook-based precoder. A transmitter may determine a LOS codebook 405, and the transmitter may select a precoder from the LOS codebook 405 for precoding signals for transmission to a receiver. For instance, in the example that $N_r \leq N_t$, the transmitter may select a Legendre precoder 410, a DFT precoder 415, or a Walsh precoder 420 from the LOS codebook 405. Alternatively, in the example that $N_r > N_t$, the transmitter may select a block-Legendre precoder 425, a block-DFT precoder 430, or a block-Walsh precoder 435 from the LOS codebook 405.

In addition to, or as an alternative to, the precoders in FIG. 4, a transmitter in wireless communications system 100 may utilize a precoder based on distance feedback or LOS MIMO channel state feedback. For example, the receiver may estimate a channel based on channel state information reference signals transmitted by the transmitter and calculate a spectral efficiency for one or more precoders of a set of precoders associated with the channel for a LOS MIMO mode. Each precoder may include a first component associated with an estimated phase of the channel and a second component associated with a distance between the transmitter and receiver. The receiver may send feedback to the transmitter that indicates a selected precoder of the set of LOS MIMO precoders based on the calculated spectral efficiencies. For example, the receiver may report a precoder index from the set of LOS MIMO precoders. In some cases, the precoders may be based on Slepian sequences or a Hermite-Gaussian polynomial, and such techniques enable a more accurate precoder for LOS MIMO but with limited overhead. Further, for conditions where $R \geq Nd_r d_t / \lambda$, (where R refers to the distance between the transmitter antenna array and receiver antenna array, N refers to the number of antenna elements in the transmitter antenna array and the receiver antenna array, $d_r$ and $d_t$ are the antenna separations in the receiver and transmitter aperture, and $\lambda$ is the wavelength of the transmitted signal), precoders based on a Slepian sequence perform as well as SVD based precoders, but with less overhead. Precoders based on Hermite-Gaussian polynomials achieve similar performance to SVD precoders, but with less overhead.

Figure 5:
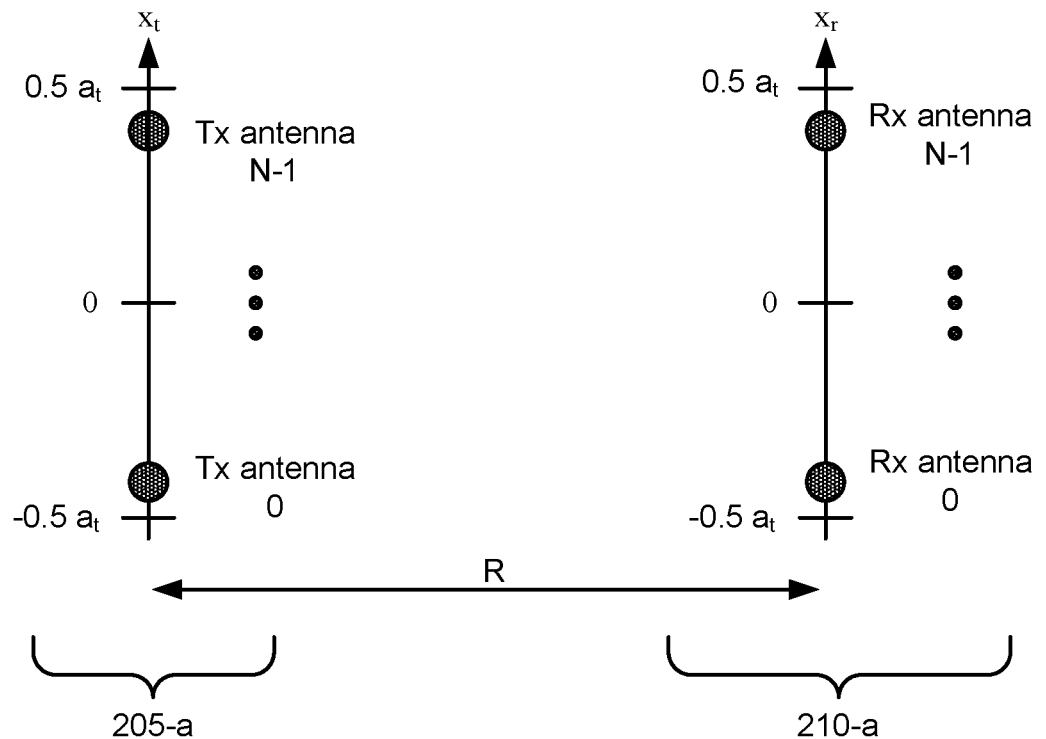
FIG. 5 illustrates an example of antenna arrays at a transmitter and a receiver that support codebook design for closed loop operation in accordance with aspects of the present disclosure.

FIG. 5 illustrates an example of antenna arrays 500 that supports codebook design for closed loop operation in accordance with aspects of the present disclosure. The antenna arrays include a transmitter antenna array 205-a and a receiver antenna array 210-a, which may be examples of antenna arrays 205 and 210, respectively, as described herein. In some examples, a base station 105 as described herein may include a transmitter antenna array 205-a and a UE 115 as described herein may include a receiver antenna array 210-a.

A precoder matrix for LOS MIMO communications between a transmitter associated with the transmitter antenna array 205-a and a receiver associated with the receiver antenna array 210-a may be based on distance feedback information or LOS MIMO channel state feedback information. A precoder matrix may be based on a Slepian sequence, as described herein. For example, Equation 5 below provides a precoder matrix P for LOS MIMO based on a Slepian sequence. In Equation 5, R refers to the distance between the transmitter antenna array 205-*a* and the receiver antenna array 210-*a*. L refers to the number of layers, $d_r$ and $d_t$ are the antenna separations in the receiver and transmitter aperture, $x_r(m)$ and $x_t(n)$ denotes the location of the m-th receive and the n-th transmit antenna. Further, the distance R=λd, $d_r$=λ$h_r$, and $d_t$=λ$h_t$. The first component of Equation 5 is a diagonal matrix, and the second component (dpss) is a Slepian sequence.

$$P = \text{diag}\left(e^{j\frac{\pi}{\lambda R}x_t^2(0:N-1)}\right) \cdot dpss\left(N, \frac{d_t d_r \cdot N^2}{2\lambda R}, L\right) \quad (5)$$

For conditions where R≥$Nd_t d_r/\lambda$, precoders based on a Slepian sequence perform as well as SVD based precoders, but with less overhead. For conditions where R<$Nd_t d_r/\lambda$, spatial aliasing may occur and the Slepian based precoder matrix may not be valid. As shown in antenna arrays 500, $a_t$:=N·$d_t$ and $a_r$:=N·$d_r$ can be viewed as the length of the transmitter and receiver antenna apertures, respectively. The half-time bandwidth-product as the second argument of the Slepian sequence of Equation 5 may therefore be written as $a_r \cdot a_t/2\lambda R$ which may be half the number of degrees of freedom achievable by continuous linear apertures. For the precoders based on a Slepian sequence, a useful rank may not be significantly larger than $a_r \cdot a_t/\lambda R$.

Accordingly, a transmitter may precode LOS MIMO messages using a Slepian based precoder if the transmitter is provided information regarding the distance R and the receiver antenna array 210-*a* spacing $d_r$.

For two-dimensional URAs communicating on a LOS MIMO channel, each axis of the URAs may be seen as a one-dimensional array. For instance, the two-dimensional URAs may correspond to an $N_{T_x} \times N_{T_y}$ array at the transmitter and an $N_{R_x} \times N_{R_y}$ array at the receiver. Further, a Kronecker product of two one-dimensional arrays may correspond to a two-dimensional array. Thus, the transmitter may construct a two-dimensional precoder using a Kronecker product of $V_{N_{T_x} \times N_{R_x}}$ and $V_{N_{T_y} \times N_{R_y}}$, in which $V_{N_{T_x} \times N_{R_x}}$ may be a one-dimensional precoder for a $N_{R_x} \times N_{T_x}$ channel, and $V_{N_{T_y} \times N_{R_y}}$ may be a one-dimensional precoder for a $N_{R_y} \times N_{T_y}$ channel. In particular, $V_{N_{T_x} \times N_{R_x}}$ may be a precoder for a one-dimensional array in an x-axis, and $V_{N_{T_y} \times N_{R_y}}$ may be a precoder for a one-dimensional array in a y-axis. Thus, the constructed two-dimensional precoder may be as shown in Equation 10, in which ⊗ is the Kronecker product operator.

$$V_{2D} = V_{N_{T_x} \times N_{R_x}} \otimes V_{N_{T_y} \times N_{R_y}} \quad (6)$$

An open loop Slepian based precoder, with a number of layers L may be given by Equation 7 below.

$$P = dpss(N_t, 0.2, L) \quad (7)$$

For a closed loop Slepian based precoder, as shown in Equation 5, with a limited number of layers equal to $N_r$, and assuming uniform power allocation in order to compare the open and closed loop Slepian precoders, at a channel condition of 100% LOS, the closed loop Slepian precoder achieves the same performance as an SVD precoder, but with less overhead. For high SNR conditions where the transmitter antenna array 205 and receiver antenna array 210 are symmetric, the open loop Slepian precoder may achieve a performance similar to the closed loop Slepian precoder. Where the transmitter antenna array 205 and the receiver antenna array 210 are asymmetric, and especially for lower SNR conditions, the closed loop Slepian performer may perform better than the open loop Slepian precoder. At a channel condition of 99% LOS, the closed loop Slepian precoder may achieve results that are better than but close to a Block-DFT based precoder. The effect of SNR of the channel on the performance of the closed loop Slepian precoder may be similar to observations for Rayleigh fading. The gain from the closed loop Slepian precoder may be larger for lower SNR conditions. The closed loop Slepian precoder may achieve a useful gain even with imperfect distance feedback information.

Closed loop precoders may alternatively be based on a Hermite-Gaussian polynomial. Electric field distributions may be given by a product of a Gaussian function and a Hermite polynomial and phase term, as illustrated in Equations 8-12 below, where $H_n(x)$ is the Hermite polynomial with the non-negative integer index n. The indices n and m determine the shape of the profile in the x and y direction, respectively. The quantities W and R evolve in the z direction (Gaussian beam model).

$$E_{nm}(x, y, z) = E_o \frac{W_o}{W(z)} \cdot H_n\left(\sqrt{2}\frac{x}{W(z)}\right) \exp\left(-\frac{x^2}{W(z)^2}\right) \cdot H_m\left(\sqrt{2}\frac{y}{W(z)}\right) \quad (8)$$

$$\exp\left(-\frac{y^2}{W(z)^2}\right) \cdot \exp\left(-i\left(kz - (1+n+m)\arctan\frac{z}{z_r} + \frac{k(x^2+y^2)}{2R(z)}\right)\right)$$

$$k = \frac{2\pi}{\lambda} \quad (9)$$

$$W(z) = W_o \sqrt{1 + \left(\frac{Z}{Z_r}\right)^2} \quad (10)$$

$$Z_r = \frac{\pi W_o^2}{\lambda} \quad (11)$$

$$R(z) = z\left(1 + \left(\frac{Z_r}{Z}\right)^2\right) \quad (12)$$

For large distances, z>>$z_R$ and z>>1, then $$R(z) \approx z \text{ and } W(z) \approx \frac{\lambda}{\pi W_o}z,$$

then Equation 8 is given by Equation 13 below. When coordinates in Equation 13 are normalized by λ, Equation 14 is given.

$$E_{n,m}(x, y, z) \propto \quad (13)$$

$$H_n\left(x\frac{\pi W_o \sqrt{2}}{\lambda z}\right) H_m\left(y\frac{\pi W_o \sqrt{2}}{\lambda z}\right) e^{-\frac{(x+y)^2}{\left(\frac{\lambda z}{\pi W_o}\right)^2}} e^{-\frac{j2\pi z}{\lambda}} e^{-\frac{j\pi(x+y)^2}{\lambda z}} e^{\mp\frac{j\pi(n+m+1)}{2}}$$

$$E_{n,m}(x, y, z) \propto \quad (14)$$

-continued $$H_n\left(x\frac{\pi w_o\sqrt{2}}{z}\right)H_m\left(y\frac{\pi w_o\sqrt{2}}{z}\right)e^{-\frac{(x+y)^2}{\left(\frac{z}{\pi w_o}\right)^2}}e^{-j2\pi z}e^{-\frac{j\pi(x+y)^2}{z}}e^{+\frac{j\pi(n+m+1)}{2}}$$

Accordingly, a closed loop codebook from LOS MIMO may be constructed based on Hermite polynomials and achieve a similar performance to SVD based precoders. The codebook for an nth column is given by Equation 15 below, where $\tilde{H}_n(N,x)$ is the nth Hermite polynomials sampled "N samples" on interval [−x,x] followed by a QR decomposition step for orthogonalization. The first component of Equation 15 is a diagonal matrix and the second component is a Hermite polynomial.

$$P(:,n) = \text{diag}\left(e^{j\frac{\pi}{d}x_t^2(0:N_t-1)}\right) \cdot \tilde{H}_n\left(N_t, \frac{h_t N_t \pi}{\sqrt{2}d}\right) \quad (15)$$

A transmitter may precode LOS MIMO messages using a Slepian based precoder or a Hermite-Gaussian based precoder if the transmitter is provided information regarding the distance between the transmitter antenna array 205-a and the receiver antenna array 210-a and the receiver antenna array 210-a spacing. Both the Slepian based precoder and the Hermite-Gaussian based precoder include a diagonal matrix first component associated with the estimated phase of the LOS MIMO channel and a second component (e.g., the Slepian Sequence or Hermite-Gaussian polynomial) associated with the distance between the transmitter antenna array 205-a and the receiver antenna array 210-a.

Figure 6:
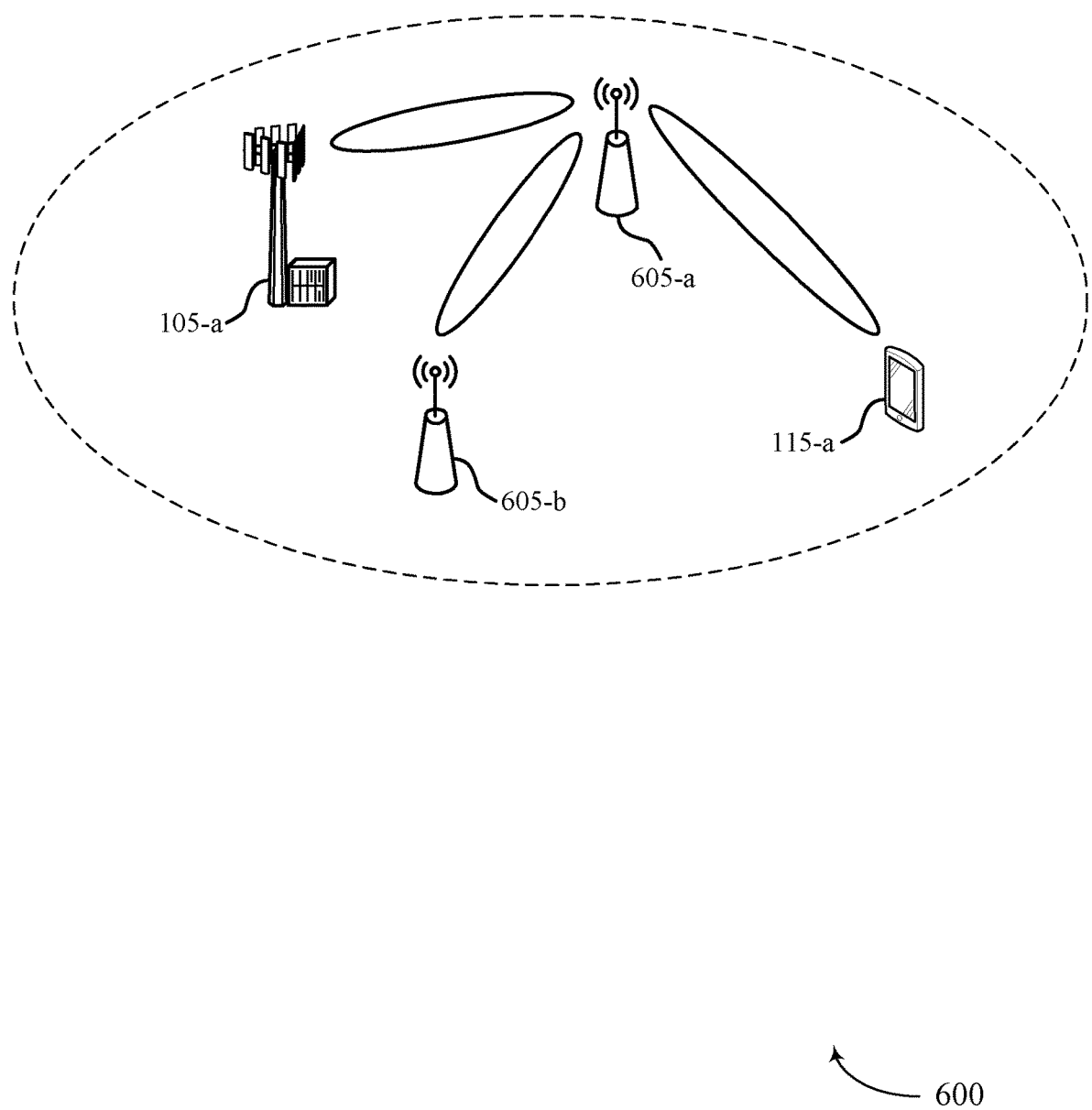
FIG. 6 illustrates an example of a wireless communications system that supports codebook design for closed loop operation in accordance with aspects of the present disclosure.

FIG. 6 illustrates an example of a wireless communications system 600 that supports codebook design for closed loop operation in accordance with aspects of the present disclosure. The wireless communications system 600 includes a UE 115-a, which may be an example of a UE 115 described herein. The wireless communications system 600 also includes a base station 105-a, which may be an example of a base station 105 described herein. The wireless communications system 600 also includes a first relay 605-a and a second relay 605-b, which may relay communications between the base station 105-a and the UE 115-a. The UE 115-a, the base station 105-a, the first relay 605-a, and the second relay 605-b may each correspond to a transmitter or a transmitting device described herein. The wireless communications system 600 may implement aspects of wireless communications system 100. For example, the wireless communications system 600 may support efficient techniques for precoding for LOS MIMO communications.

A transmitter (e.g., a base station 105-a) may precode messages using a closed loop LOS MIMO precoding scheme, as described herein. A closed loop LOS MIMO codebook may be based on transmitter and receiver array configurations and the distance between the transmitter and the receiver or LOS MIMO channel state feedback. For example, the receiver (e.g., the UE 115-a) may estimate a channel based on channel state information reference signals transmitted by the base station 105-a, and the UE 115-a may calculate a spectral efficiency for one or more precoders of a set of precoders associated with the channel for a LOS MIMO mode. In some examples, the base station 105-a may transmit the set of precoders to the UE 115-a. Each precoder may include a first component associated with an estimated phase of the channel and a second component associated with a distance between the transmitter and receiver. The UE 115-a may report feedback to the base station 105-a that indicates a selected precoder of the set of LOS MIMO precoders based on the calculated spectral efficiencies. For example, the UE 115-a may report a precoder index from the set of LOS MIMO precoders. In some examples, the set of LOS MIMO precoders may be based on a set of distance intervals, where there is a corresponding precoder for each distance interval between the UE 115-a and the base station 105-a for a given rank and number of antenna ports. In some cases, the precoders may be based on Slepian sequences (i.e., discrete prolate spheroidal sequences) or a Hermite-Gaussian polynomial, and such techniques enable a more accurate precoder for LOS MIMO but with limited overhead. The base station 105-a may transmit a message to the receiver using a precoding scheme based on the reported precoder.

In some examples, the UE 115-a may report distance information and information regarding the antenna array configuration of the UE 115-a to the base station 105-a, and the base station 105-a may determine a closed loop precoder based on the reported distance information and information regarding the UE 115-a antenna array configuration. For example, the base station 105-a may determine the precoder using a Slepian based precoder or a Hermite-Gaussian based precoder, as described herein, using the reported distance and UE 115-a antenna array configuration information. In some examples, the UE 115-a may determine the distance based on received positioning reference signals transmitted by the base station 105-a. In some examples, the UE 115-a may report the position of the UE 115-a calculated by a global positioning system or by a mobility procedure. In some examples, the base station 105-a may estimate the distance between the UE 115-a and the base station 105-a based on sounding reference signal(s) transmitted by the UE 115-a. Accordingly, in some examples, the base station 105-a may determine a precoder based on the estimated distance and information received from the UE 115-a corresponding to the UE 115-a antenna array configuration.

The base station 105-a may select to use the reported closed loop precoder or an open loop precoder based on channel conditions or the receiver and antenna array configurations. For example, the base station 105-a may select whether to use the reported closed loop precoder or an open loop precoder based on an estimated signal to noise SNR of the channel, an estimated SINR of the channel, an estimated LOS percentage of the channel, an antenna configuration of the receiver, an antenna array configuration of the transmitter, or a combination thereof.

Figure 7:
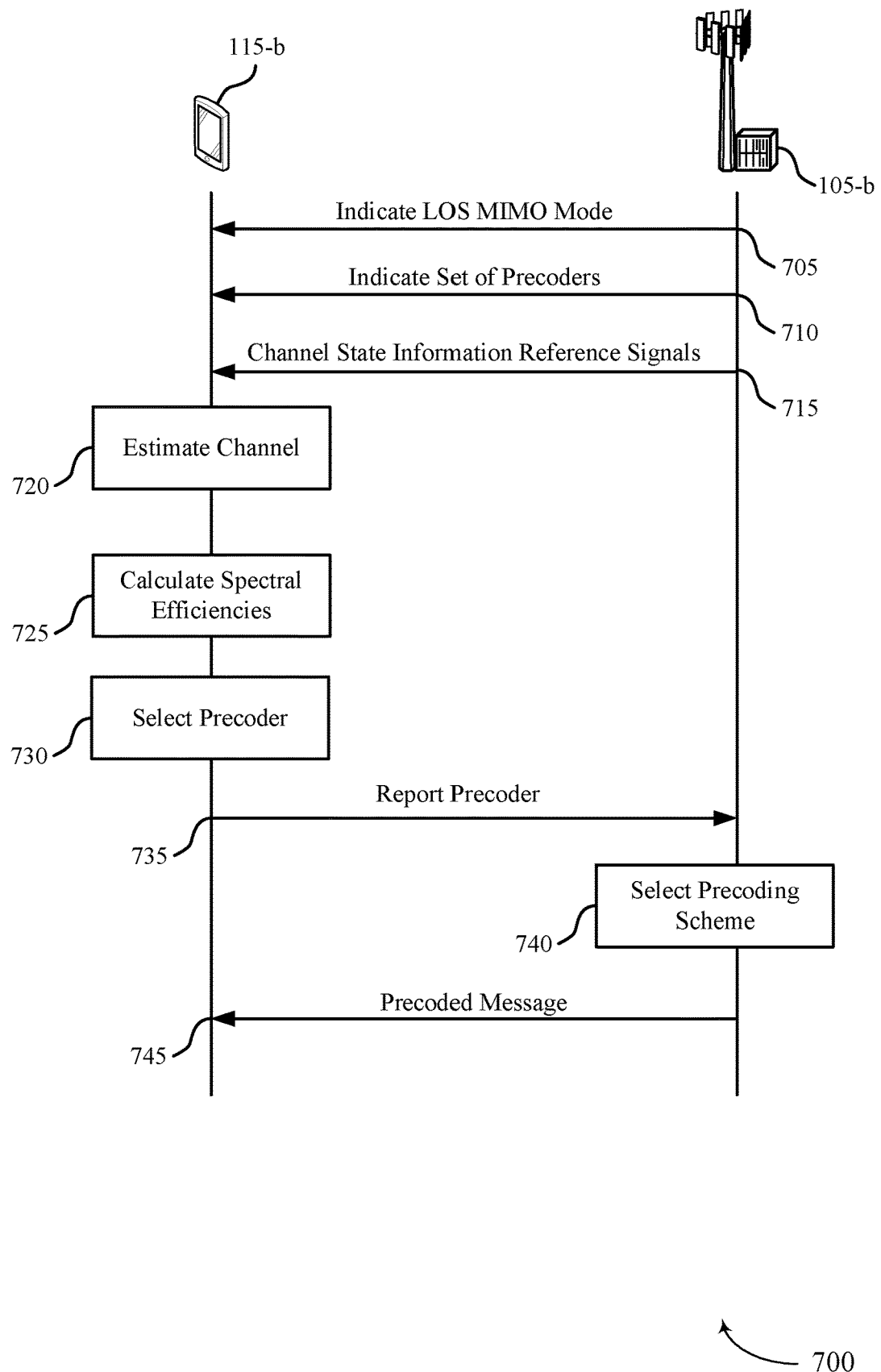
FIG. 7 illustrates an example of a process flow that supports codebook design for closed loop operation in accordance with aspects of the present disclosure.

FIG. 7 illustrates an example of a process flow 700 that supports codebook design for closed loop operation in accordance with aspects of the present disclosure. Process flow 700 includes a UE 115-b, which may be an example of a UE 115 described herein. The UE 115-b may operate in an LOS MIMO mode and may support precoding using closed loop precoders. Process flow 700 also includes a base station 105-b, which may be an example of a base station 105 described herein. The process flow 700 may be implemented by or may implement aspects of wireless communications systems 600 or 100. For example, the process flow 700 may support efficient techniques for precoding for LOS MIMO communications. Although FIG. 7 illustrates the base station 105-b as a transmitter, other devices (for example, a UE 115 or a relay) may support similar techniques to transmit to the base station 105-b.

In the following description of the process flow 700, the signaling exchanged between UE 115-b and base station 105-b may be exchanged in a different order than the example order shown, or the operations performed by the UE 115-b and the base station 105-b may be performed in different orders or at different times. Some operations may also be omitted from the process flow 700, and other operations may be added to the process flow 700.

At 705, the base station 105-b may indicate, to the UE 115-b, that the base station 105-b may initiate LOS MIMO communications on a communications channel with the UE 115-b. At 710, the base station 105-b may transmit a configuration of a set of precoders associated with the channel for the LOS MIMO mode. The set of precoders may each include a first component associated with an estimated phase of the channel and a second component associated with a distance between the UE 115-b and the base station 105-b. In some examples, the second component is one of a Slepian sequence or a Hermite-Gaussian polynomial. In some examples, each precoder of the set of precoders is associated with a respective distance interval for a given rank and number of antenna ports at the UE 115-b and base station 105-b.

At 715, the base station 105-b may transmit, and the UE 115-b may receive, channel state information reference signals. At 720, the UE 115-b estimates the channel (e.g., determines a channel estimate for the channel) based on the channel state information reference signals received at 715. For example, the UE 115-b may apply signal processing techniques such as a mean square error estimate to estimate the channel from the channel state information reference signals.

At 725, the UE 115-b may calculate a spectral efficiency for each of the set of precoders received at 710. For example, the UE 115-b may calculate a projected spectral efficiency for each of the set of precoders under the assumption for each respective precoder that the respective precoder is used by the base station 105-b to transmit a signal and that the estimated channel represents the actual channel on which the base station 105-b will transmit the signal. In some examples, the estimated phase associated with the first component is estimated based on the distance between the UE 115-b and the base station 105-b, a wavelength of the channel, an antenna configuration of the UE 115-b, an antenna configuration of the base station 105-b, or a combination thereof. In some examples, the UE 115-b may receive, from the base station 105-b, an indication of the antenna array configuration of the base station 105-b, for example in the messages received at 705 or at 710. In some examples, the UE 115-b may calculate the spectral efficiencies for each precoder based on receiving the indication at 705 to initiate the LOS MIMO mode.

At 730, the UE 115-b may select a precoder of the set of precoders based on the calculated spectral efficiencies of the set of precoders. For example, the UE 115-b may select the precoder associated with a highest calculated spectral efficiency. In some examples, where each precoder of the set of precoders is associated with a respective distance interval for a given rank and number of antenna ports at the UE 115-b and base station 105-b, the UE 115-b may select the precoder based on the distance interval between the UE 115-b and the base station 105-b.

At 735, the UE 115-b may transmit, to the base station 105-b, a report indicating the selected precoder of the set of precoders. In some examples, the UE 115-b may report a LOS MIMO precoding matrix indicator associated with the selected precoder. In some examples, the UE 115-b may report a precoder index from the set of LOS MIMO precoders received at 710.

At 740, the base station 105-b may select one of a closed loop precoding scheme or an open loop precoding scheme for the LOS MIMO channel. In some examples, the base station 105-b selects a closed loop precoding scheme or an open loop precoding scheme based on an LOS percentage of the channel, an SNR of the channel, and SINR of the channel, an antenna configuration of the UE 115-b, an antenna configuration of the base station 105-b, or a combination thereof. For example, an open loop precoding scheme may achieve similar performance as a closed loop precoding scheme at higher SNR and/or SINR with symmetric antenna configurations at the UE 115-b and the base station 105-b, an open loop precoding scheme is associated with less overhead than a closed loop precoding scheme. Accordingly, in some examples, if the antenna configurations at the UE 115-b and the base station 105-b are symmetric, the base station 105-b may select an open loop precoding scheme if the SNR or SINR is high or the base station 105-b may select a closed loop precoding scheme if the SNR or SINR is low. As another example, a closed loop precoding scheme may achieve better performance than an open loop precoding scheme with asymmetric antenna configurations at the UE 115-b and the base station 105-b and/or at lower SNR or SINR. Accordingly, in some examples the base station 105-b may select a closed loop precoding scheme if the antenna configurations at the UE 115-b and the base station 105-b are asymmetric. In some examples, the UE 115-b provides an indication of the antenna array configuration of the UE 115-b to the base station 105-b. In some examples, selecting the closed loop precoding scheme results in selecting the precoder reported by the UE 115-b at 735.

In some examples, the base station 105-b may estimate the LOS percentage of the channel and select the closed loop precoding scheme or the open loop precoding scheme based on the estimated LOS percentage of the channel. In some examples, the base station 105-b may estimate the SNR or SINR of the channel and select the closed loop precoding scheme or the open loop precoding scheme based on the estimated SNR or SINR of the channel.

At 745, the base station 105-b may transmit, to the UE 115-b, a message precoded using the selected precoding scheme.

In some examples, the UE 115-b may report distance information and/or information regarding the antenna array configuration of the UE 115-b to the base station 105-b, and the base station 105-b may determine a closed loop precoder based on the reported distance information and information regarding the UE 115-b antenna array configuration. For example, the base station 105-b may determine the closed loop precoder using a Slepian based precoder or a Hermite-Gaussian based precoder, as described herein, using the reported distance and UE 115-b antenna array configuration information. In some examples, the UE 115-b may determine the distance based on received positioning reference signals transmitted by the base station 105-b. In some examples, the UE 115-b may report the position of the UE 115-b calculated by a global positioning system or by a mobility procedure. In some examples, the base station 105-b may estimate the distance between the UE 115-b and the base station 105-b based on sounding reference signal(s) transmitted by the UE 115-b. Accordingly, in some examples, the base station 105-b may determine a precoder based on the estimated distance and information received from the UE 115-b corresponding to the UE 115-b antenna array configuration.

Figure 8:
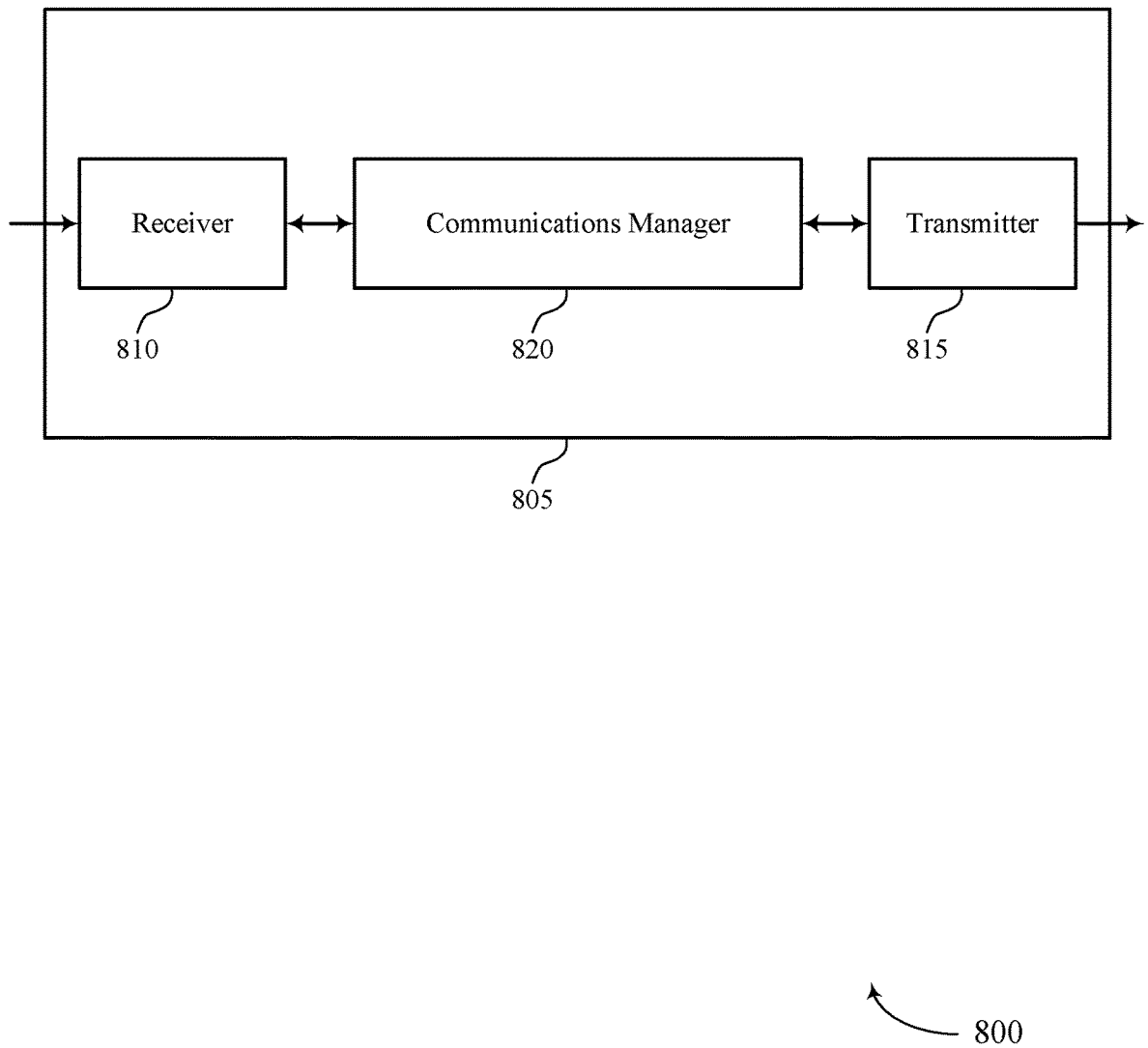
FIGS. 8 and 9 show block diagrams of devices that support codebook design for closed loop operation in accordance with aspects of the present disclosure.

FIG. 8 shows a block diagram 800 of a device 805 that supports codebook design for closed loop operation in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to codebook design for closed loop operation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to codebook design for closed loop operation). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of codebook design for closed loop operation as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for receiving, from a base station, a set of multiple channel state information reference signals. The communications manager 820 may be configured as or otherwise support a means for estimating a channel based on the set of multiple channel state information reference signals. The communications manager 820 may be configured as or otherwise support a means for calculating a spectral efficiency for one or more precoders of a set of precoders associated with the channel for a line-of-sight multiple-input multiple-output mode, where the one or more precoders of the set of precoders include a first component associated with an estimated phase of the channel and a second component associated with a distance between the UE and the base station. The communications manager 820 may be configured as or otherwise support a means for transmitting, to the base station, a report indicating a precoder of the set of precoders, the precoder selected based on calculating the spectral efficiency.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing and more efficient utilization of communications resources. In particular, because a transmitter may utilize closed loop precoding for LOS MIMO communications, the transmitter may identify a precoder for precoding signals for transmission to a receiver without full spatial sounding. As a result, a more accurate precoder may be supported for LOS MIMO with limited overhead, which may allow more resources to be available for other communications in a wireless communications system.

Figure 9:
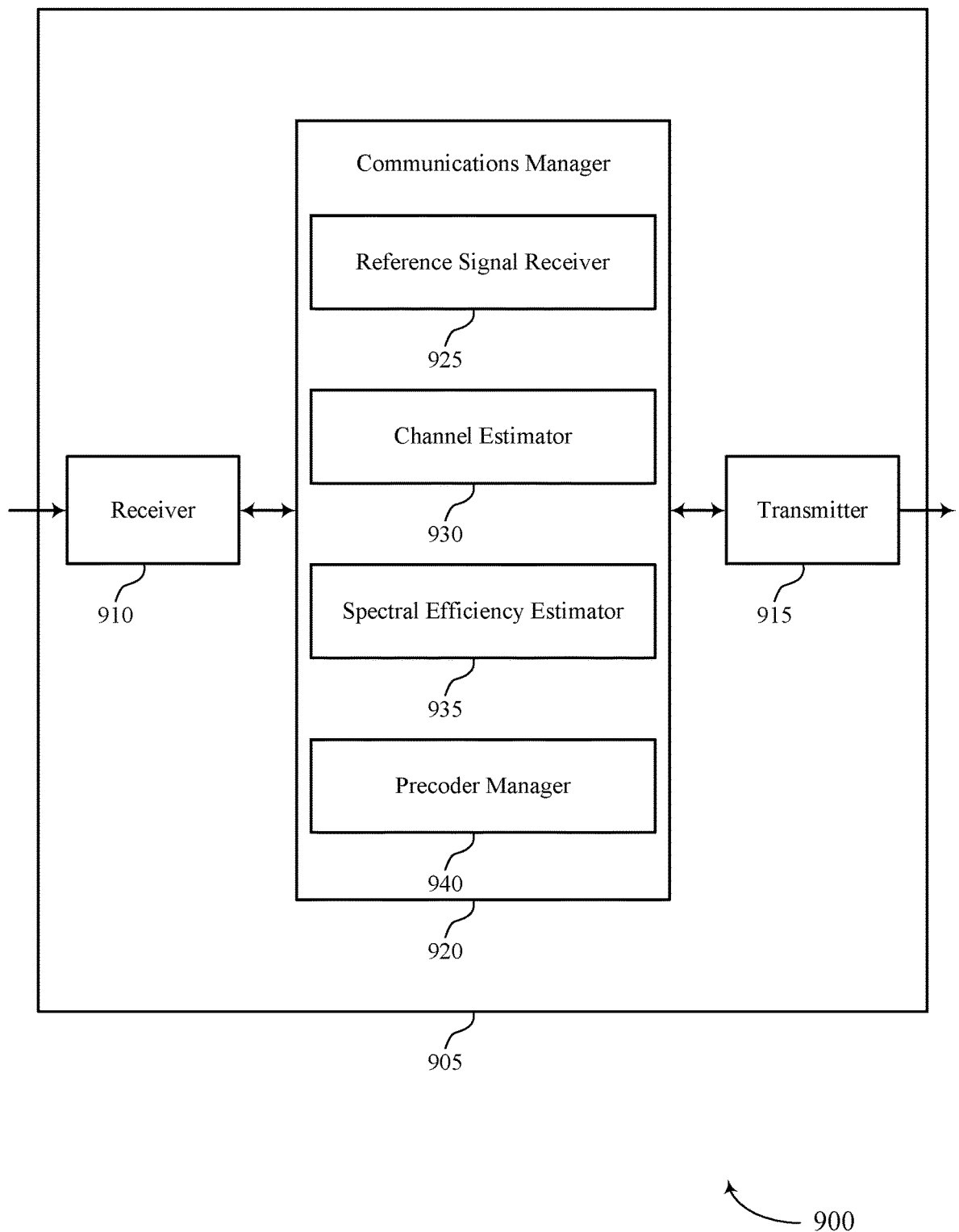

FIG. 9 shows a block diagram 900 of a device 905 that supports codebook design for closed loop operation in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to codebook design for closed loop operation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to codebook design for closed loop operation). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of codebook design for closed loop operation as described herein. For example, the communications manager 920 may include a reference signal receiver 925, a channel estimator 930, a spectral efficiency estimator 935, a precoder manager 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The reference signal receiver 925 may be configured as or otherwise support a means for receiving, from a base station, a set of multiple channel state information reference signals. The channel estimator 930 may be configured as or otherwise support a means for estimating a channel based on the set of multiple channel state information reference signals. The spectral efficiency estimator 935 may be configured as or otherwise support a means for calculating a spectral efficiency for one or more precoders of a set of precoders associated with the channel for a line-of-sight multiple-input multiple-output mode, where the one or more precoders of the set of precoders include a first component associated with an estimated phase of the channel and a second component associated with a distance between the UE and the base station. The precoder manager 940 may be configured as or otherwise support a means for transmitting, to the base station, a report indicating a precoder of the set of precoders, the precoder selected based on calculating the spectral efficiency.

Figure 10:
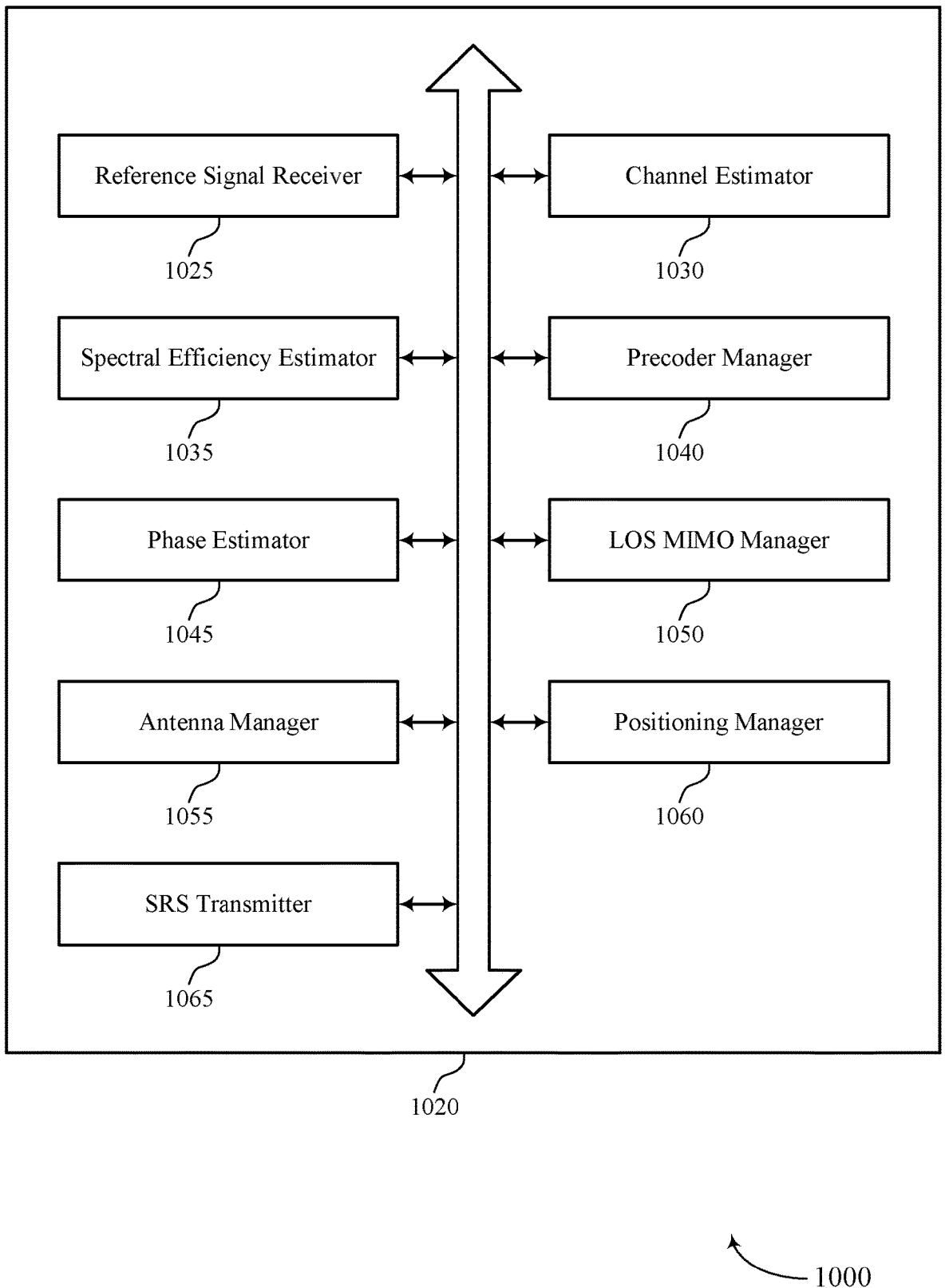
FIG. 10 shows a block diagram of a communications manager that supports codebook design for closed loop operation in accordance with aspects of the present disclosure.

FIG. 10 shows a block diagram 1000 of a communications manager 1020 that supports codebook design for closed loop operation in accordance with aspects of the present disclosure. The communications manager 1020 may be an example of aspects of a communications manager 820, a communications manager 920, or both, as described herein. The communications manager 1020, or various components thereof, may be an example of means for performing various aspects of codebook design for closed loop operation as described herein. For example, the communications manager 1020 may include a reference signal receiver 1025, a channel estimator 1030, a spectral efficiency estimator 1035, a precoder manager 1040, a phase estimator 1045, a LOS MIMO Manager 1050, an antenna manager 1055, a positioning manager 1060, an SRS transmitter 1065, or any combination thereof. Each of these components may communicate, directly or indirectly, with one another (e.g., via one or more buses).

The communications manager 1020 may support wireless communications at a UE in accordance with examples as disclosed herein. The reference signal receiver 1025 may be configured as or otherwise support a means for receiving, from a base station, a set of multiple channel state information reference signals. The channel estimator 1030 may be configured as or otherwise support a means for estimating a channel based on the set of multiple channel state information reference signals. The spectral efficiency estimator 1035 may be configured as or otherwise support a means for calculating a spectral efficiency for one or more precoders of a set of precoders associated with the channel for a line-of-sight multiple-input multiple-output mode, where the one or more precoders of the set of precoders include a first component associated with an estimated phase of the channel and a second component associated with a distance between the UE and the base station. The precoder manager 1040 may be configured as or otherwise support a means for transmitting, to the base station, a report indicating a precoder of the set of precoders, the precoder selected based on calculating the spectral efficiency.

In some examples, the precoder manager 1040 may be configured as or otherwise support a means for selecting the precoder from the set of precoders based on a distance interval associated with the distance between the UE and the base station, where each precoder of the set of precoders is associated with a respective distance interval, a respective rank, a respective number of antenna ports at the UE, or a combination thereof. By selecting the precoder from the set of precoders based on a distance interval associated with the distance between the UE and the base station, the precoder manager may support techniques for reduced processing and more efficient utilization of communications resources. In particular, selecting the precoder from the set of precoders based on a distance interval may enable the UE to identify and report a precoder without full spatial sounding.

In some examples, the phase estimator 1045 may be configured as or otherwise support a means for estimating the estimated phase of the channel associated with the first component based on the distance between the UE and the base station, a wavelength of the channel, an antenna configuration of the UE, an antenna configuration of the base station, or a combination thereof. Estimating the phase of the channel may enable the UE to select an accurate precoder that includes a phase component without full spatial sounding.

In some examples, the precoder manager 1040 may be configured as or otherwise support a means for selecting the precoder of the set of precoders, where the selected precoder is associated with a highest calculated spectral efficiency. Selecting a precoder associated with a highest calculated spectral efficiency may allow the UE and the base station to communicate using resources which may be associated with less interference and fewer interruptions.

In some examples, the second component includes one of a Slepian sequence or a Hermite-Gaussian polynomial. Precoders including Slepian sequences or Hermite Gaussian polynomials may be as accurate as precoders based on full spatial sounding, but are associated with less overhead.

In some examples, the LOS MIMO Manager 1050 may be configured as or otherwise support a means for receiving, from the base station, an indication to initiate the line-of-sight multiple-input multiple-output mode, where calculating the spectral efficiency for each precoder of the set of precoders associated with the channel for the line-of-sight multiple-input multiple-output mode is based on the indication to initiate the line-of-sight multiple-input multiple-output mode. Receiving an indication to initiate the line-of-sight multiple-input multiple-output mode may enable the UE and base station to communicate using the line-of-sight multiple-input multiple-output mode under conditions where line-of-sight multiple-input multiple-output mode is more efficient than MMIMO or to communicate using MMIMO under conditions where MMIMI is more efficient than line-of-sight multiple-input multiple-output.

In some examples, the antenna manager 1055 may be configured as or otherwise support a means for transmitting, to the base station, an indication of an antenna configuration of the UE. In some examples, the antenna manager 1055 may be configured as or otherwise support a means for receiving, from the base station, an indication of the antenna configuration of the base station. Communicating antenna configurations may enable the UE and the base station to determine LOS MIMO precoders that are more accurate as compared to an open loop precoder and associated with less overhead as compared to a precoder based on full spatial sounding.

In some examples, the precoder manager 1040 may be configured as or otherwise support a means for receiving, from the base station, an indication of the set of precoders for the line-of-sight multiple-input multiple-output mode. Receiving a set of precoders for the line-of-sight multiple-input multiple-output mode may enable the UE to select and report the most accurate precoder of the set of precoders for the line-of-sight multiple-input multiple-output mode based on estimated channel conditions without conducting full spatial sounding.

In some examples, the positioning manager 1060 may be configured as or otherwise support a means for transmitting, to the base station, an indication of the distance between the UE and the base station. In some examples, the positioning manager 1060 may be configured as or otherwise support a means for receiving, from the base station, one or more positioning reference signals, where the indication of the distance between the UE and the base station is based at least in part on the one or more positioning reference signals. Communicating distance information between the UE and the base stations may enable the UE and the base station to determine LOS MIMO precoders that are more accurate as compared to an open loop precoder and associated with less overhead as compared to a precoder based on full spatial sounding.

In some examples, the SRS transmitter 1065 may be configured as or otherwise support a means for transmitting, to the base station, a sounding reference signal indicating the distance between the UE and the base station. Transmitting a sounding reference signal indicating the distance between the UE and the base station may enable the base station to determine LOS MIMO precoders that are more accurate as compared to an open loop precoder and associated with less overhead as compared to a precoder based on full spatial sounding.

In some examples, the LOS MIMO Manager 1050 may be configured as or otherwise support a means for receiving, from the base station, a message precoded using the precoder indicated by the report. Using a precoder indicated by the report may enable LOS MIMO communications that are more accurate as compared to communications using an open loop precoder and associated with less overhead as compared to communications using a precoder based on full spatial sounding.

Figure 11:
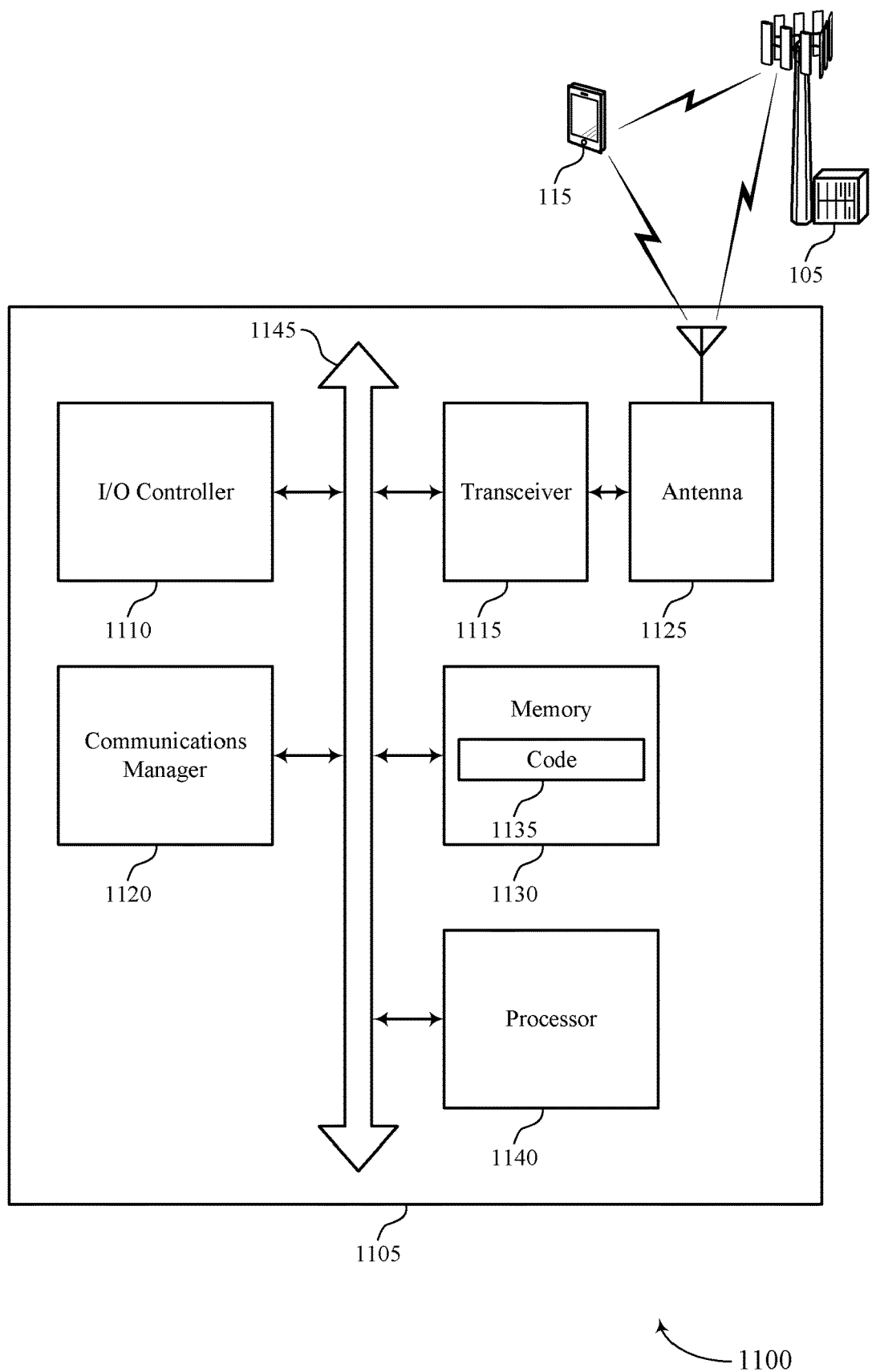
FIG. 11 shows a diagram of a system including a device that supports codebook design for closed loop operation in accordance with aspects of the present disclosure.

FIG. 11 shows a diagram of a system 1100 including a device 1105 that supports codebook design for closed loop operation in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including one or more instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting codebook design for closed loop operation). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving, from a base station, a set of multiple channel state information reference signals. The communications manager 1120 may be configured as or otherwise support a means for estimating a channel based on the set of multiple channel state information reference signals. The communications manager 1120 may be configured as or otherwise support a means for calculating a spectral efficiency for one or more precoders of a set of precoders associated with the channel for a line-of-sight multiple-input multiple-output mode, where the one or more precoders of the set of precoders include a first component associated with an estimated phase of the channel and a second component associated with a distance between the UE and the base station. The communications manager 1120 may be configured as or otherwise support a means for transmitting, to the base station, a report indicating a precoder of the set of precoders, the precoder selected based on calculating the spectral efficiency.

By including or configuring the communications manager 1120 in accordance with examples as described herein, the device 1105 may support techniques for reduced processing and more efficient utilization of communications resources. In particular, because a transmitter may utilize closed loop precoding for LOS MIMO communications, the transmitter may identify a precoder for precoding signals for transmission to a receiver without full spatial sounding. As a result, a more accurate precoder may be supported for LOS MIMO with limited overhead, allowing more resources to be available for other communications in a wireless communications system.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include one or more instructions executable by the processor 1140 to cause the device 1105 to perform various aspects of codebook design for closed loop operation as described herein, or the processor 1140 and the memory 1130 may be otherwise configured to perform or support such operations.

Figure 12:
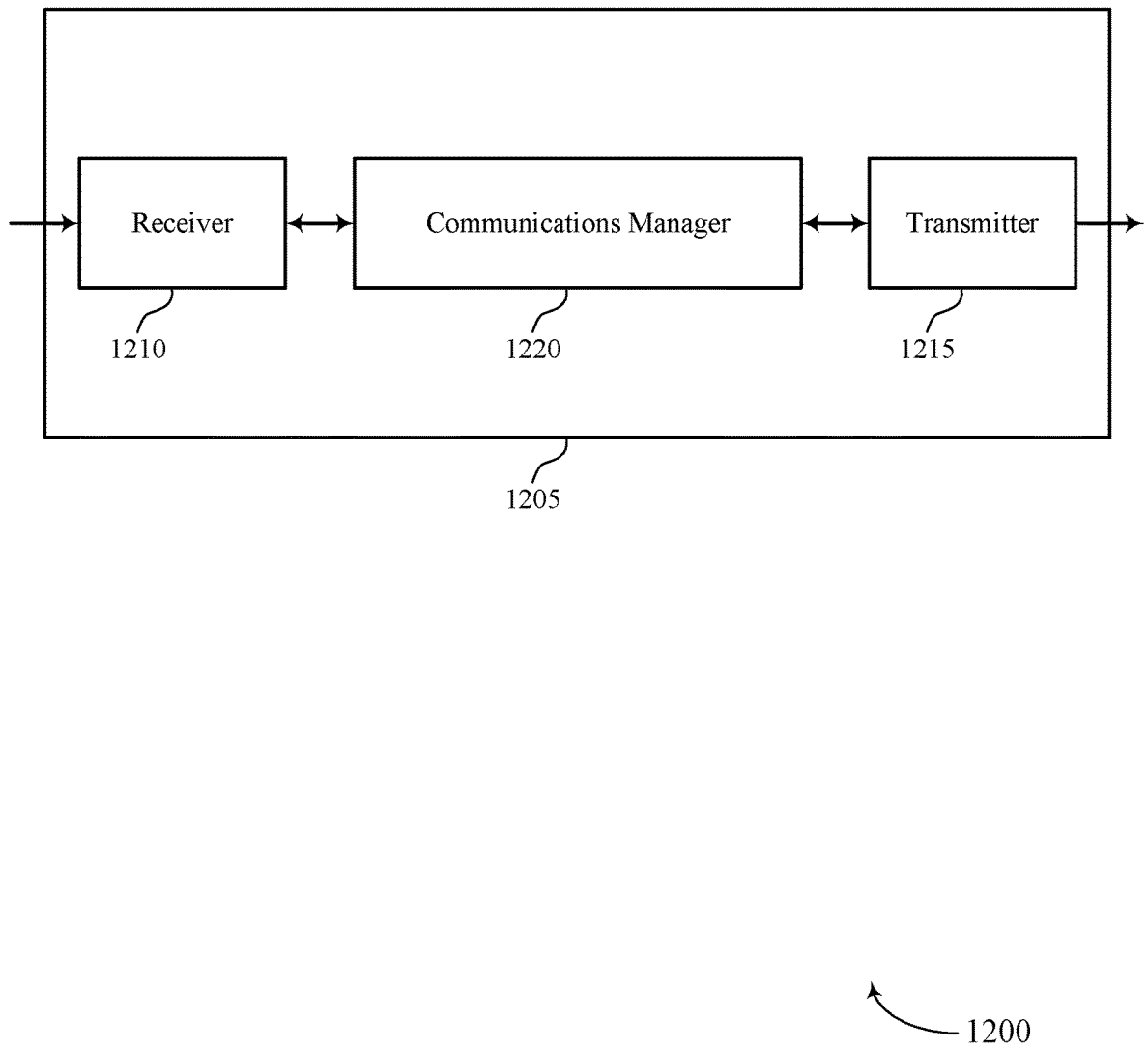
FIGS. 12 and 13 show block diagrams of devices that support codebook design for closed loop operation in accordance with aspects of the present disclosure.

FIG. 12 shows a block diagram 1200 of a device 1205 that supports codebook design for closed loop operation in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to codebook design for closed loop operation). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to codebook design for closed loop operation). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of codebook design for closed loop operation as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. For example, the communications manager 1220 may be configured as or otherwise support a means for transmitting, to a UE, a set of multiple channel state information reference signals. The communications manager 1220 may be configured as or otherwise support a means for receiving, from the UE, a report indicating a precoder associated with a channel for a line-of-sight multiple-input multiple-output mode, where the precoder includes a first component associated with a phase of the channel and a second component associated with a distance between the UE and the base station. The communications manager 1220 may be configured as or otherwise support a means for transmitting, to the UE, a message precoded using a precoding scheme for the line-of-sight multiple-input multiple-output mode based on the report.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for reduced processing and more efficient utilization of communications resources. In particular, because a transmitter may utilize closed loop precoding for LOS MIMO communications, the transmitter may identify a precoder for precoding signals for transmission to a receiver without full spatial sounding. As a result, more resources may be available for other communications in a wireless communications system.

Figure 13:
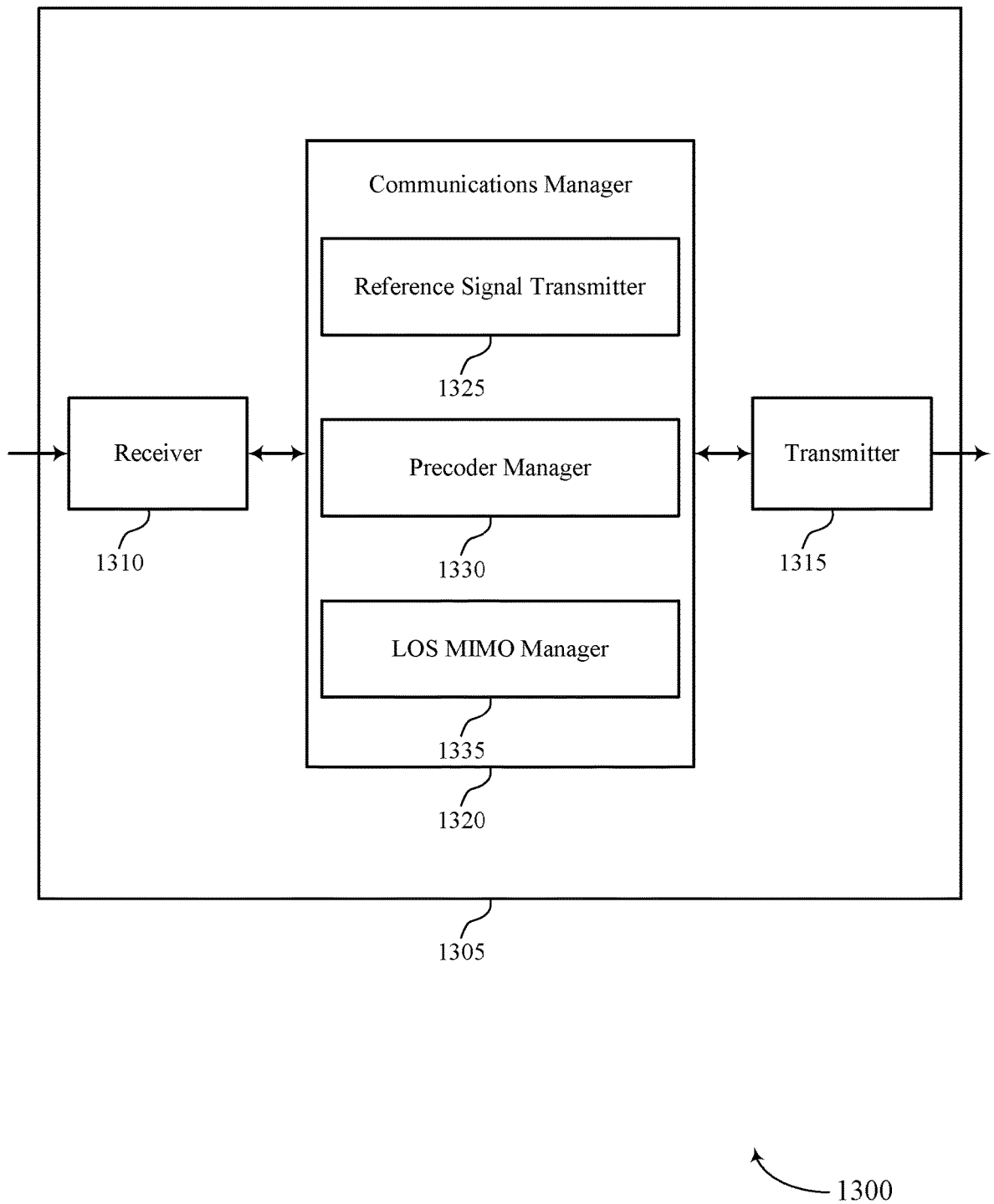

FIG. 13 shows a block diagram 1300 of a device 1305 that supports codebook design for closed loop operation in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to codebook design for closed loop operation). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to codebook design for closed loop operation). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of codebook design for closed loop operation as described herein. For example, the communications manager 1320 may include a reference signal transmitter 1325, a precoder manager 1330, a LOS MIMO manager 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. The reference signal transmitter 1325 may be configured as or otherwise support a means for transmitting, to a UE, a set of multiple channel state information reference signals. The precoder manager 1330 may be configured as or otherwise support a means for receiving, from the UE, a report indicating a precoder associated with a channel for a line-of-sight multiple-input multiple-output mode, where the precoder includes a first component associated with a phase of the channel and a second component associated with a distance between the UE and the base station. The LOS MIMO manager 1335 may be configured as or otherwise support a means for transmitting, to the UE, a message precoded using a precoding scheme for the line-of-sight multiple-input multiple-output mode based on the report.

Figure 14:
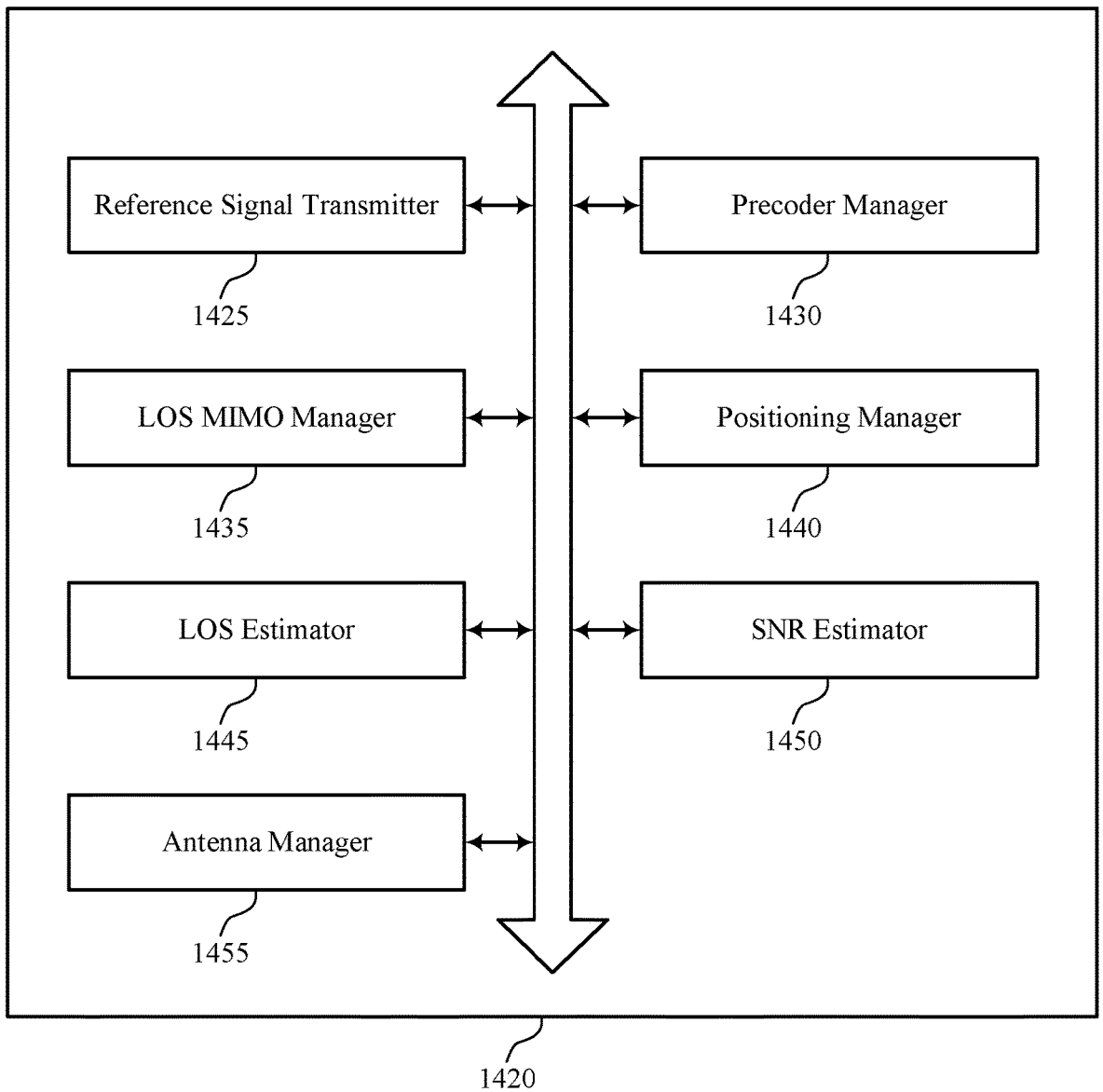
FIG. 14 shows a block diagram of a communications manager that supports codebook design for closed loop operation in accordance with aspects of the present disclosure.

FIG. 14 shows a block diagram 1400 of a communications manager 1420 that supports codebook design for closed loop operation in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of codebook design for closed loop operation as described herein. For example, the communications manager 1420 may include a reference signal transmitter 1425, a precoder manager 1430, a LOS MIMO manager 1435, a positioning manager 1440, a LOS estimator 1445, an SNR estimator 1450, an antenna manager 1455, or any combination thereof. Each of these components may communicate, directly or indirectly, with one another (e.g., via one or more buses).

The communications manager 1420 may support wireless communications at a base station in accordance with examples as disclosed herein. The reference signal transmitter 1425 may be configured as or otherwise support a means for transmitting, to a UE, a set of multiple channel state information reference signals. The precoder manager 1430 may be configured as or otherwise support a means for receiving, from the UE, a report indicating a precoder associated with a channel for a line-of-sight multiple-input multiple-output mode, where the precoder includes a first component associated with a phase of the channel and a second component associated with a distance between the UE and the base station. The LOS MIMO manager 1435 may be configured as or otherwise support a means for transmitting, to the UE, a message precoded using a precoding scheme for the line-of-sight multiple-input multiple-output mode based on the report.

In some examples, the precoder manager 1430 may be configured as or otherwise support a means for selecting the precoding scheme as one of a closed loop precoding scheme or an open loop precoding scheme based on a signal to noise ratio of the channel, a signal to interference and noise ratio of the channel, a line-of-sight percentage of the channel, an antenna configuration of the UE, an antenna configuration of the base station, or a combination thereof. Selecting the precoding scheme as one of a closed loop precoding scheme or an open loop precoding scheme based on a signal to noise ratio of the channel, a signal to interference and noise ratio of the channel, a line-of-sight percentage of the channel, an antenna configuration of the UE, an antenna configuration of the base station, or a combination thereof may enable the base station to select the more efficient precoding scheme based on estimated channel conditions.

In some examples, to support transmitting the message precoded using the closed loop precoding scheme, the LOS MIMO manager 1435 may be configured as or otherwise support a means for transmitting the message precoded using the precoder received from the UE. Using a precoder indicated by the UE may enable LOS MIMO communications that are more accurate as compared to communications using an open loop precoder and associated with less overhead as compared to communications using a precoder based on full spatial sounding.

In some examples, the LOS estimator 1445 may be configured as or otherwise support a means for estimating the line-of-sight percentage of the channel. In some examples, the precoder manager 1430 may be configured as or otherwise support a means for selecting the precoding scheme as the closed loop precoding scheme based on the line-of-sight percentage of the channel. Estimating a line-of-sight percentage of the channel may enable the base station to determine to use LOS MIMO communications or MMIMO communications based on the estimated line-of-sight percentage, as LOS MIMO communications may be associated with higher efficiency when the line-of-sight percentage of the channel is higher.

In some examples, the SNR estimator 1450 may be configured as or otherwise support a means for estimating the signal to noise ratio of the channel or the signal to interference and noise ratio of the channel. In some examples, the precoder manager 1430 may be configured as or otherwise support a means for selecting the precoding scheme as the closed loop precoding scheme based on the signal to noise ratio of the channel or the signal to interference and noise ratio of the channel. Selecting the precoding scheme as one of a closed loop precoding scheme or an open loop precoding scheme based on a signal to noise ratio of the channel or a signal to interference and noise ratio of the channel may enable the base station to select the more efficient precoding scheme based on estimated channel conditions.

In some examples, the antenna manager 1455 may be configured as or otherwise support a means for receiving, from the UE, an indication of the antenna configuration of the UE. In some examples, the precoder manager 1430 may be configured as or otherwise support a means for selecting the precoding scheme as the closed loop precoding scheme based on the indication of the antenna configuration of the UE. Communicating antenna configurations may enable the UE and the base station to determine LOS MIMO precoders that are more accurate as compared to an open loop precoder and associated with less overhead as compared to a precoder based on full spatial sounding.

In some examples, the positioning manager 1440 may be configured as or otherwise support a means for receiving, from the UE, an indication of the distance between the UE and the base station. In some examples, the positioning manager 1440 may be configured as or otherwise support a means for transmitting, to the UE, one or more positioning reference signals, where the indication of the distance between the UE and the base station is based at least in part on the one or more positioning reference signals. Communicating distance information between the UE and the base stations may enable the UE and the base station to determine LOS MIMO precoders that are more accurate as compared to an open loop precoder and associated with less overhead as compared to a precoder based on full spatial sounding.

In some examples, the positioning manager 1440 may be configured as or otherwise support a means for receiving, from the UE, a sounding reference signal indicating the distance between the UE and the base station. Receiving a sounding reference signal indicating the distance between the UE and the base station may enable the base station to determine LOS MIMO precoders that are more accurate as compared to an open loop precoder and associated with less overhead as compared to a precoder based on full spatial sounding.

In some examples, the second component includes one of a Slepian sequence or a Hermite-Gaussian polynomial. Precoders including Slepian sequences or Hermite Gaussian polynomials may be as accurate as precoders based on full spatial sounding, but are associated with less overhead.

Figure 15:
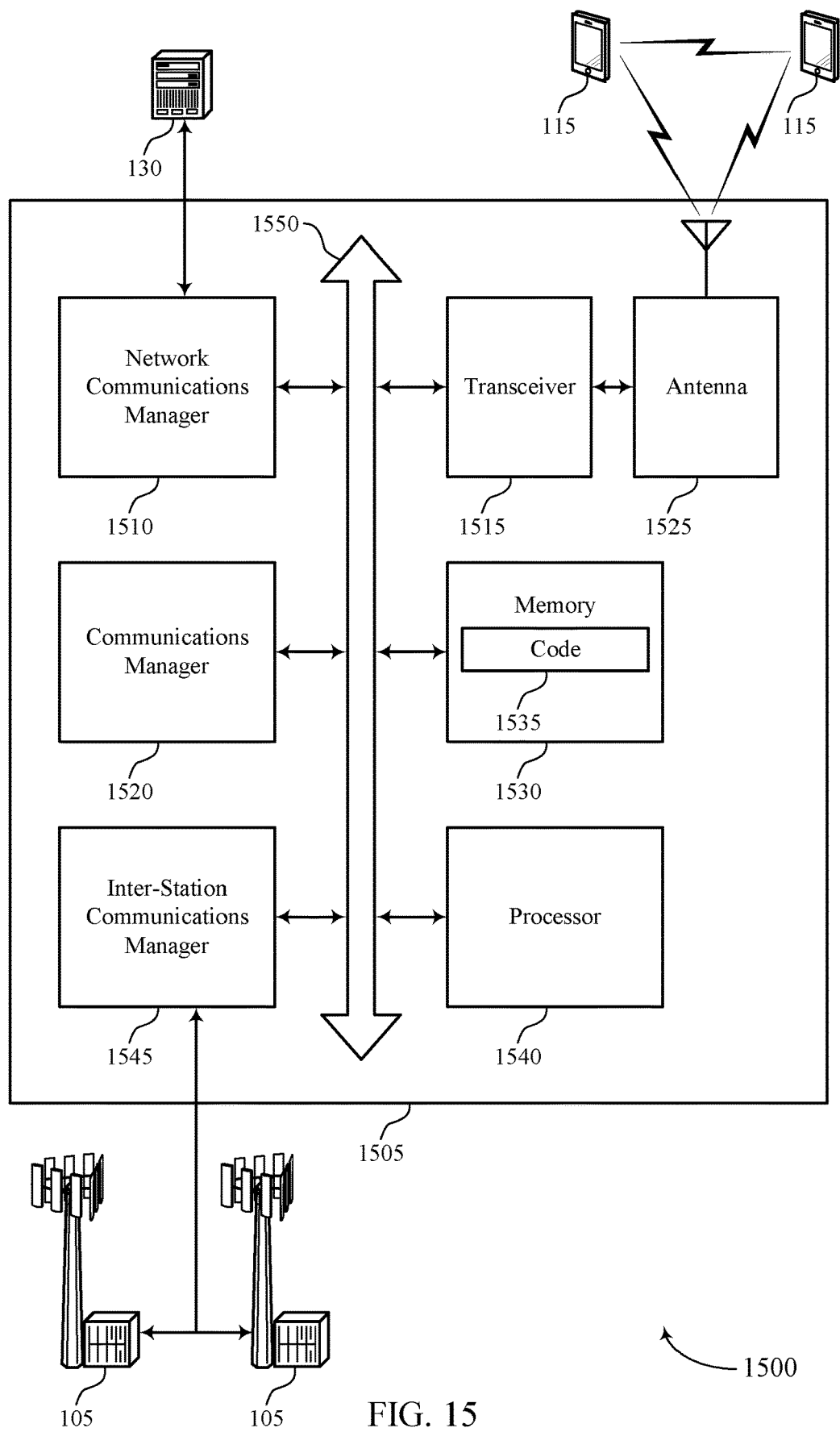
FIG. 15 shows a diagram of a system including a device that supports codebook design for closed loop operation in accordance with aspects of the present disclosure.

FIG. 15 shows a diagram of a system 1500 including a device 1505 that supports codebook design for closed loop operation in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including one or more instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting codebook design for closed loop operation). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communications at a base station in accordance with examples as disclosed herein. For example, the communications manager 1520 may be configured as or otherwise support a means for transmitting, to a UE, a set of multiple channel state information reference signals. The communications manager 1520 may be configured as or otherwise support a means for receiving, from the UE, a report indicating a precoder associated with a channel for a line-of-sight multiple-input multiple-output mode, where the precoder includes a first component associated with a phase of the channel and a second component associated with a distance between the UE and the base station. The communications manager 1520 may be configured as or otherwise support a means for transmitting, to the UE, a message precoded using a precoding scheme for the line-of-sight multiple-input multiple-output mode based on the report.

By including or configuring the communications manager 1520 in accordance with examples as described herein, the device 1505 may support techniques for reduced processing and more efficient utilization of communications resources. In particular, because a transmitter may utilize closed loop precoding for LOS MIMO communications, the transmitter may identify a precoder for precoding signals for transmission to a receiver without full spatial sounding. As a result, more resources may be available for other communications in a wireless communications system.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include one or more instructions executable by the processor 1540 to cause the device 1505 to perform various aspects of codebook design for closed loop operation as described herein, or the processor 1540 and the memory 1530 may be otherwise configured to perform or support such operations.

Figure 16:
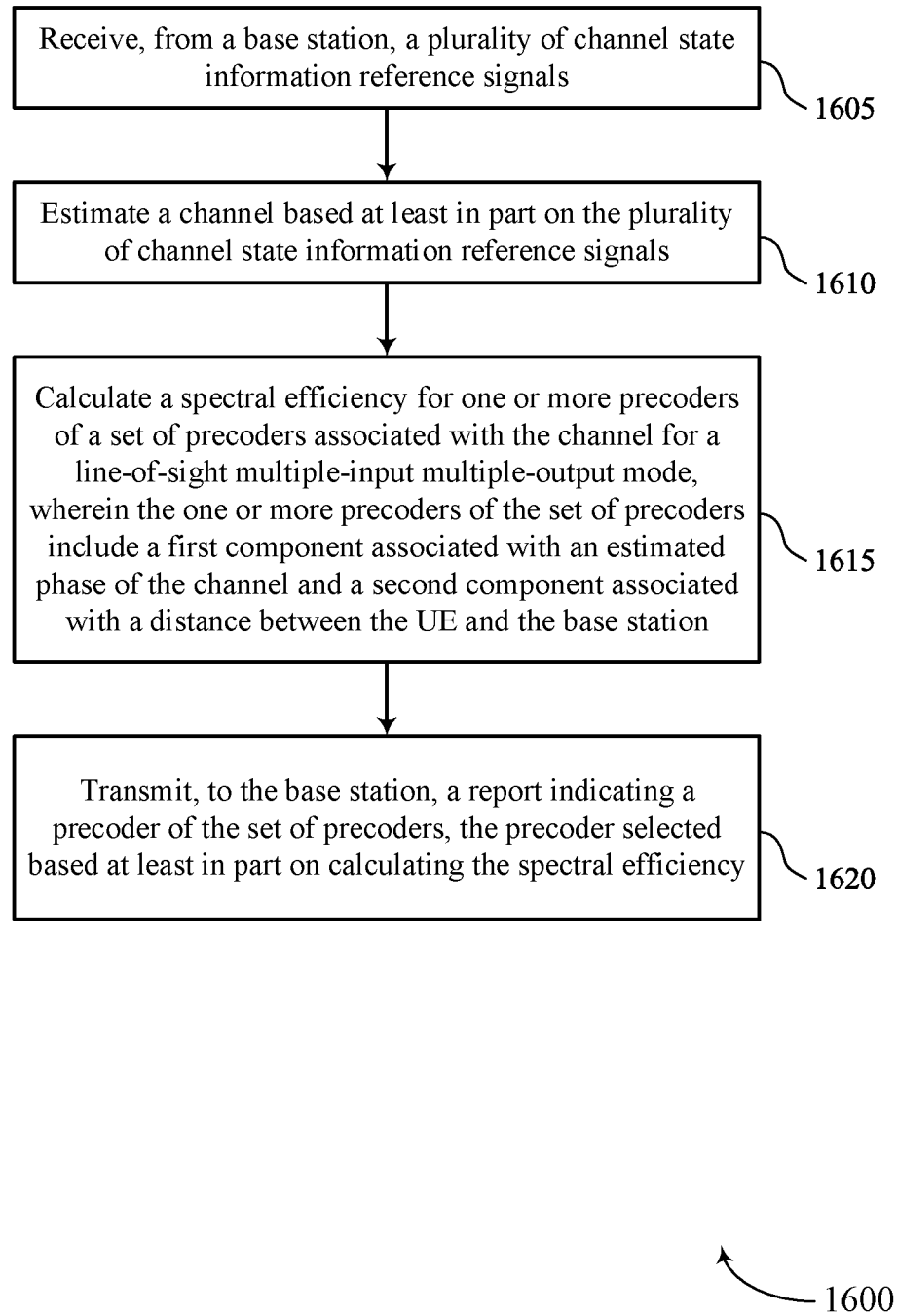
FIGS. 16 through 22 show flowcharts illustrating methods that support codebook design for closed loop operation in accordance with aspects of the present disclosure.

FIG. 16 shows a flowchart illustrating a method 1600 that supports codebook design for closed loop operation in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute one or more instructions to control the functional elements of the UE to perform the described functions. Additionally or alternatively, the UE may perform aspects of the described functions using special-purpose hardware.

At 1605, the method may include receiving, from a base station, a set of multiple channel state information reference signals. The operations of 1605 may be performed in accordance with examples as disclosed herein. In some examples, aspects of the operations of 1605 may be performed by a reference signal receiver 1025 as described with reference to FIG. 10.

At 1610, the method may include estimating a channel based on the set of multiple channel state information reference signals. The operations of 1610 may be performed in accordance with examples as disclosed herein. In some examples, aspects of the operations of 1610 may be performed by a channel estimator 1030 as described with reference to FIG. 10.

At 1615, the method may include calculating a spectral efficiency for one or more precoders of a set of precoders associated with the channel for a line-of-sight multiple-input multiple-output mode, where the one or more precoders of the set of precoders include a first component associated with an estimated phase of the channel and a second component associated with a distance between the UE and the base station. The operations of 1615 may be performed in accordance with examples as disclosed herein. In some examples, aspects of the operations of 1615 may be performed by a spectral efficiency estimator 1035 as described with reference to FIG. 10.

At 1620, the method may include transmitting, to the base station, a report indicating a precoder of the set of precoders, the precoder selected based on calculating the spectral efficiency. The operations of 1620 may be performed in accordance with examples as disclosed herein. In some examples, aspects of the operations of 1620 may be performed by a precoder manager 1040 as described with reference to FIG. 10.

Figure 17:
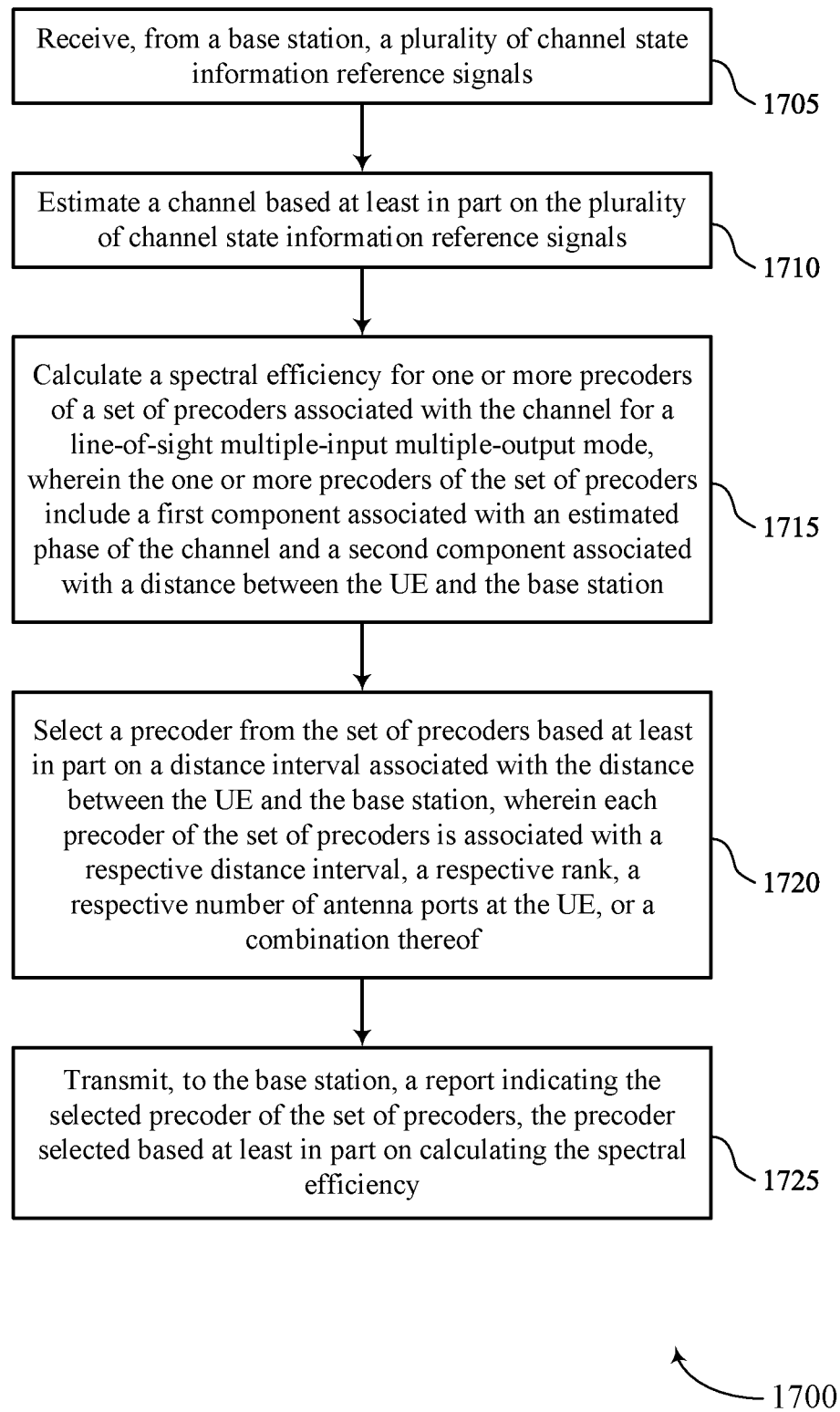

FIG. 17 shows a flowchart illustrating a method 1700 that supports codebook design for closed loop operation in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute one or more instructions to control the functional elements of the UE to perform the described functions. Additionally or alternatively, the UE may perform aspects of the described functions using special-purpose hardware.

At 1705, the method may include receiving, from a base station, a set of multiple channel state information reference signals. The operations of 1705 may be performed in accordance with examples as disclosed herein. In some examples, aspects of the operations of 1705 may be performed by a reference signal receiver 1025 as described with reference to FIG. 10.

At 1710, the method may include estimating a channel based on the set of multiple channel state information reference signals. The operations of 1710 may be performed in accordance with examples as disclosed herein. In some examples, aspects of the operations of 1710 may be performed by a channel estimator 1030 as described with reference to FIG. 10.

At 1715, the method may include calculating a spectral efficiency for one or more precoders of a set of precoders associated with the channel for a line-of-sight multiple-input multiple-output mode, where the one or more precoders of the set of precoders include a first component associated with an estimated phase of the channel and a second component associated with a distance between the UE and the base station. The operations of 1715 may be performed in accordance with examples as disclosed herein. In some examples, aspects of the operations of 1715 may be performed by a spectral efficiency estimator 1035 as described with reference to FIG. 10.

At 1720, the method may include selecting a precoder from the set of precoders based on a distance interval associated with the distance between the UE and the base station, where each precoder of the set of precoders is associated with a respective distance interval, a respective rank, a respective number of antenna ports at the UE, or a combination thereof. The operations of 1720 may be performed in accordance with examples as disclosed herein. In some examples, aspects of the operations of 1720 may be performed by a precoder manager 1040 as described with reference to FIG. 10.

At 1725, the method may include transmitting, to the base station, a report indicating the selected precoder of the set of precoders, the precoder selected based on calculating the spectral efficiency. The operations of 1725 may be performed in accordance with examples as disclosed herein. In some examples, aspects of the operations of 1725 may be performed by a precoder manager 1040 as described with reference to FIG. 10.

Figure 18:
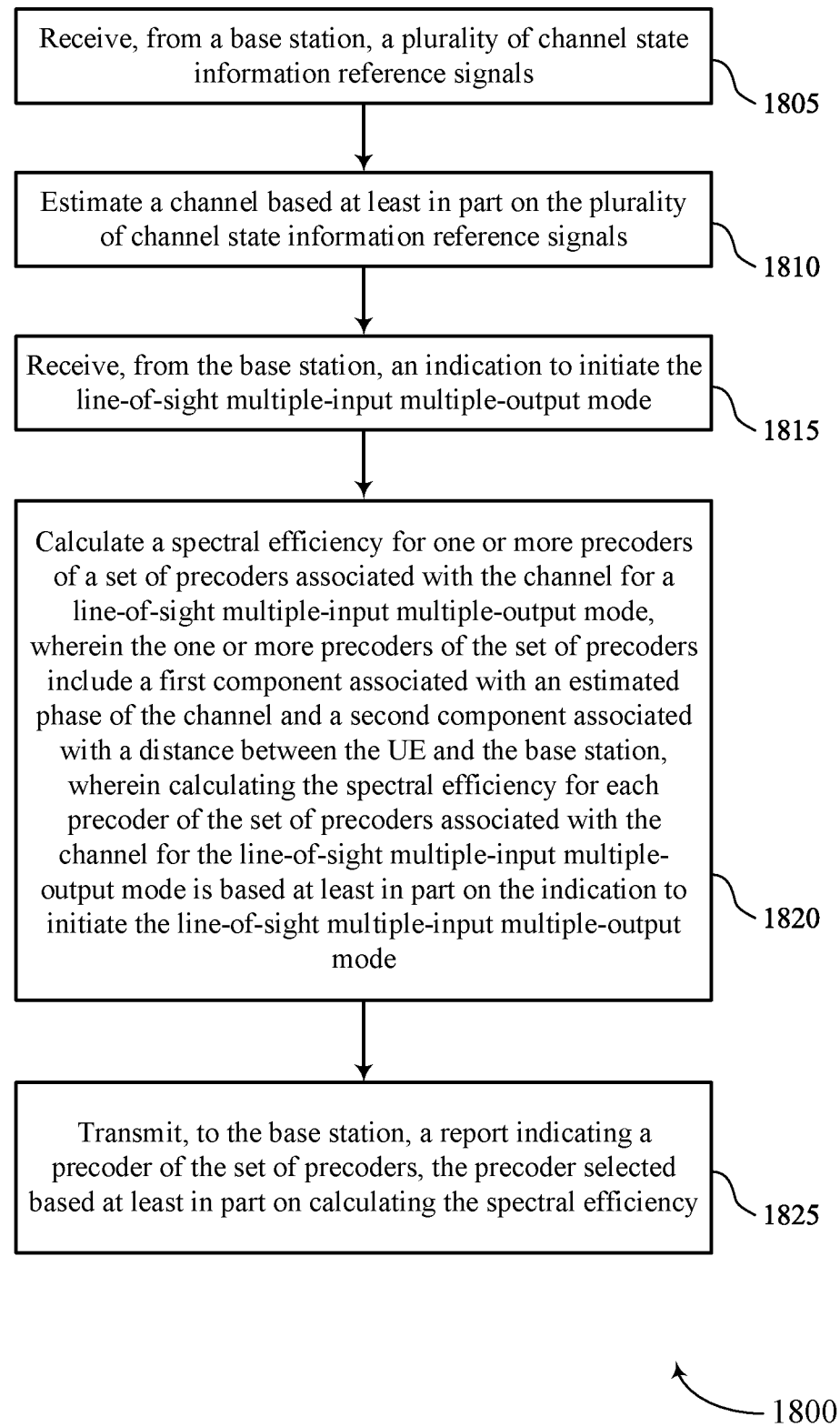

FIG. 18 shows a flowchart illustrating a method 1800 that supports codebook design for closed loop operation in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute one or more instructions to control the functional elements of the UE to perform the described functions. Additionally or alternatively, the UE may perform aspects of the described functions using special-purpose hardware.

At 1805, the method may include receiving, from a base station, a set of multiple channel state information reference signals. The operations of 1805 may be performed in accordance with examples as disclosed herein. In some examples, aspects of the operations of 1805 may be performed by a reference signal receiver 1025 as described with reference to FIG. 10.

At 1810, the method may include estimating a channel based on the set of multiple channel state information reference signals. The operations of 1810 may be performed in accordance with examples as disclosed herein. In some examples, aspects of the operations of 1810 may be performed by a channel estimator 1030 as described with reference to FIG. 10.

At 1815, the method may include receiving, from the base station, an indication to initiate the line-of-sight multiple-input multiple-output mode. The operations of 1815 may be performed in accordance with examples as disclosed herein. In some examples, aspects of the operations of 1815 may be performed by a LOS MIMO Manager 1050 as described with reference to FIG. 10.

At 1820, the method may include calculating a spectral efficiency for one or more precoders of a set of precoders associated with the channel for a line-of-sight multiple-input multiple-output mode, where the one or more precoders of the set of precoders include a first component associated with an estimated phase of the channel and a second component associated with a distance between the UE and the base station, where calculating the spectral efficiency for each precoder of the set of precoders associated with the channel for the line-of-sight multiple-input multiple-output mode is based on the indication to initiate the line-of-sight multiple-input multiple-output mode. The operations of 1820 may be performed in accordance with examples as disclosed herein. In some examples, aspects of the operations of 1820 may be performed by a spectral efficiency estimator 1035 as described with reference to FIG. 10.

At 1825, the method may include transmitting, to the base station, a report indicating a precoder of the set of precoders, the precoder selected based on calculating the spectral efficiency. The operations of 1825 may be performed in accordance with examples as disclosed herein. In some examples, aspects of the operations of 1825 may be performed by a precoder manager 1040 as described with reference to FIG. 10.

Figure 19:
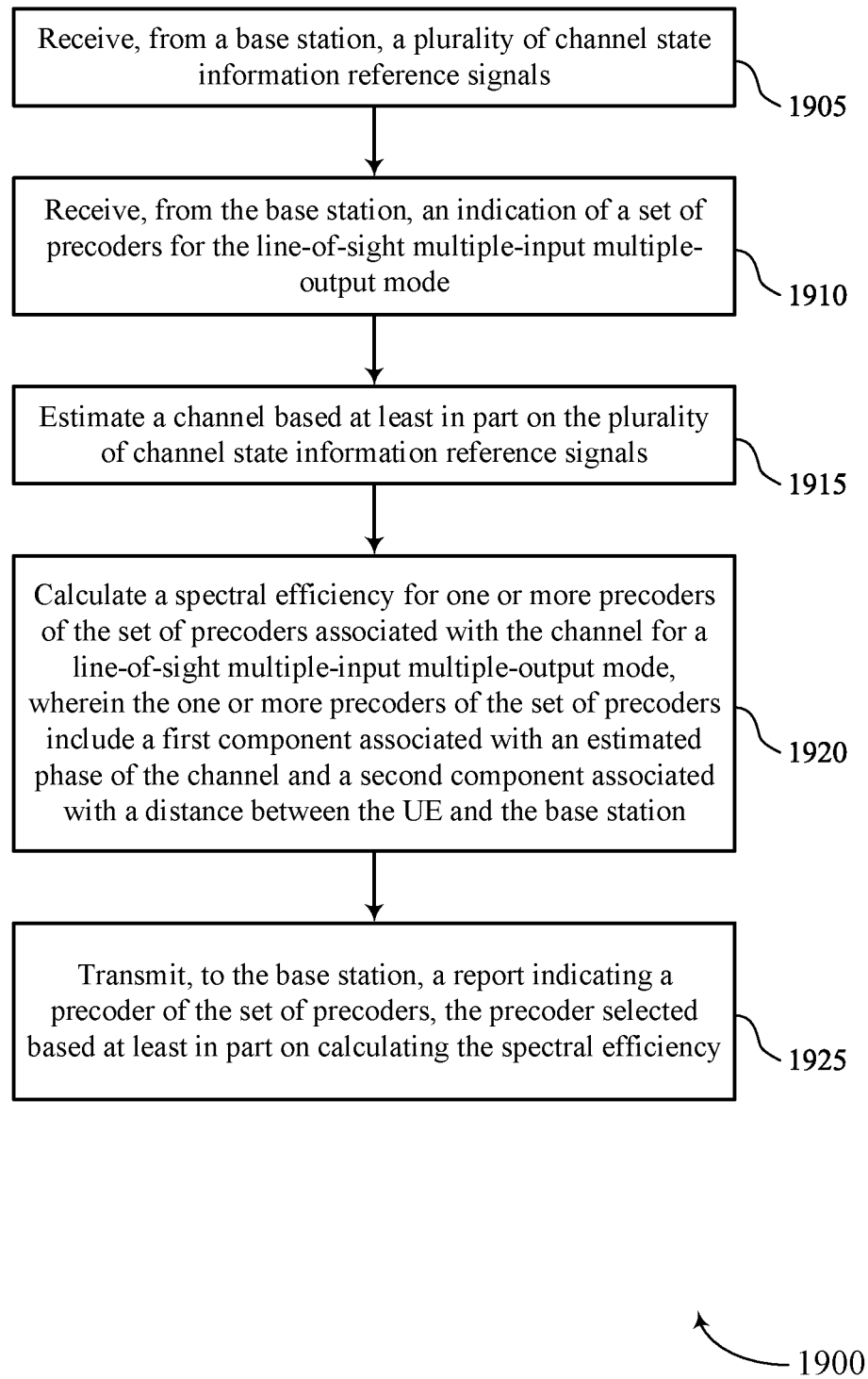

FIG. 19 shows a flowchart illustrating a method 1900 that supports codebook design for closed loop operation in accordance with aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute one or more instructions to control the functional elements of the UE to perform the described functions. Additionally or alternatively, the UE may perform aspects of the described functions using special-purpose hardware.

At 1905, the method may include receiving, from a base station, a set of multiple channel state information reference signals. The operations of 1905 may be performed in accordance with examples as disclosed herein. In some examples, aspects of the operations of 1905 may be performed by a reference signal receiver 1025 as described with reference to FIG. 10.

At 1910, the method may include receiving, from the base station, an indication of a set of precoders for the line-of-sight multiple-input multiple-output mode. The operations of 1910 may be performed in accordance with examples as disclosed herein. In some examples, aspects of the operations of 1910 may be performed by a precoder manager 1040 as described with reference to FIG. 10.

At 1915, the method may include estimating a channel based on the set of multiple channel state information reference signals. The operations of 1915 may be performed in accordance with examples as disclosed herein. In some examples, aspects of the operations of 1915 may be performed by a channel estimator 1030 as described with reference to FIG. 10.

At 1920, the method may include calculating a spectral efficiency for one or more precoders of the set of precoders associated with the channel for a line-of-sight multiple-input multiple-output mode, where the one or more precoders of the set of precoders include a first component associated with an estimated phase of the channel and a second component associated with a distance between the UE and the base station. The operations of 1920 may be performed in accordance with examples as disclosed herein. In some examples, aspects of the operations of 1920 may be performed by a spectral efficiency estimator 1035 as described with reference to FIG. 10.

At 1925, the method may include transmitting, to the base station, a report indicating a precoder of the set of precoders, the precoder selected based on calculating the spectral efficiency. The operations of 1925 may be performed in accordance with examples as disclosed herein. In some examples, aspects of the operations of 1925 may be performed by a precoder manager 1040 as described with reference to FIG. 10.

Figure 20:
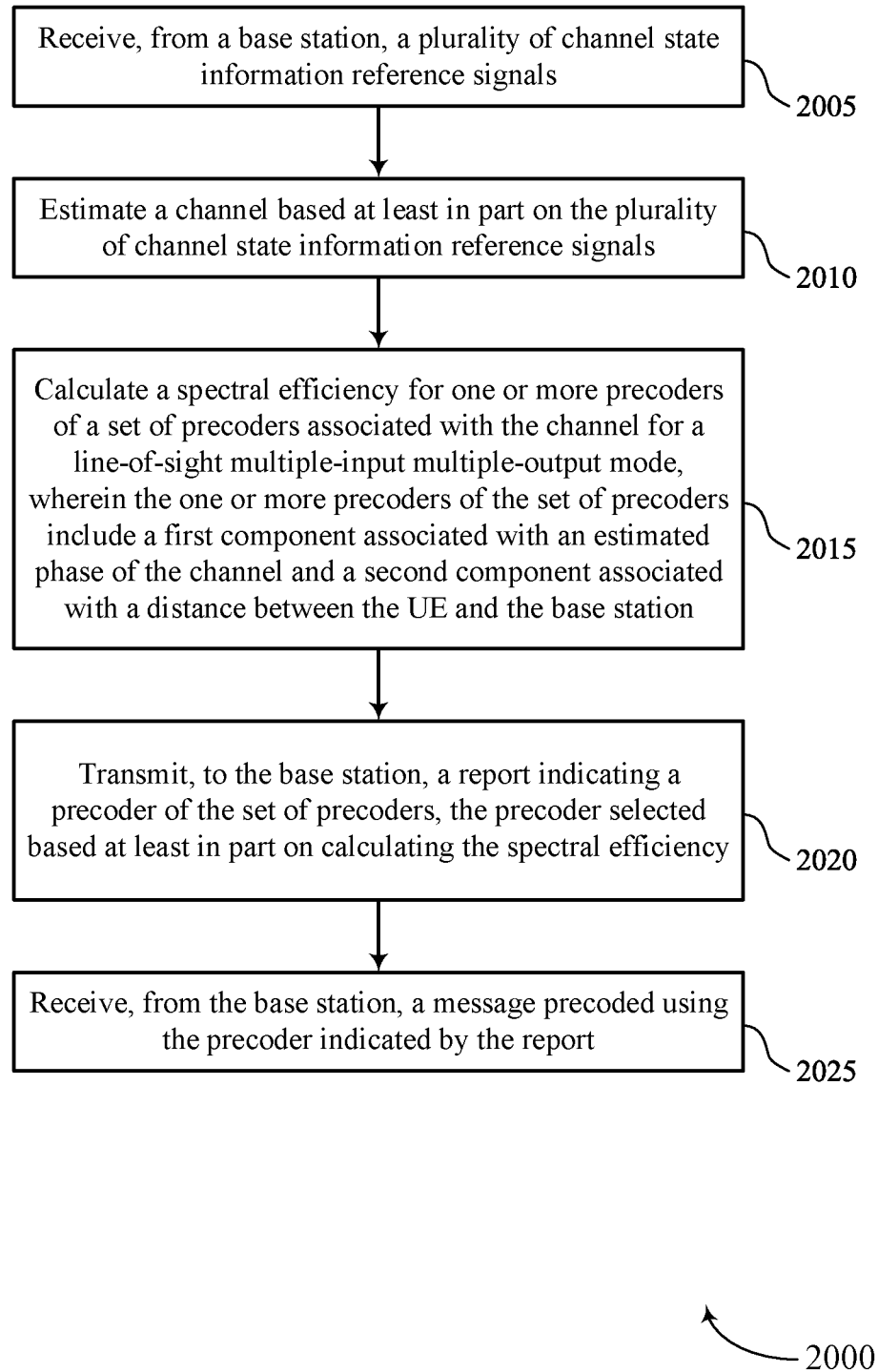

FIG. 20 shows a flowchart illustrating a method 2000 that supports codebook design for closed loop operation in accordance with aspects of the present disclosure. The operations of the method 2000 may be implemented by a UE or its components as described herein. For example, the operations of the method 2000 may be performed by a UE 115 as described with reference to FIGS. 1 through 11. In some examples, a UE may execute one or more instructions to control the functional elements of the UE to perform the described functions. Additionally or alternatively, the UE may perform aspects of the described functions using special-purpose hardware.

At 2005, the method may include receiving, from a base station, a set of multiple channel state information reference signals. The operations of 2005 may be performed in accordance with examples as disclosed herein. In some examples, aspects of the operations of 2005 may be performed by a reference signal receiver 1025 as described with reference to FIG. 10.

At 2010, the method may include estimating a channel based on the set of multiple channel state information reference signals. The operations of 2010 may be performed in accordance with examples as disclosed herein. In some examples, aspects of the operations of 2010 may be performed by a channel estimator 1030 as described with reference to FIG. 10.

At 2015, the method may include calculating a spectral efficiency for one or more precoders of a set of precoders associated with the channel for a line-of-sight multiple-input multiple-output mode, where the one or more precoders of the set of precoders include a first component associated with an estimated phase of the channel and a second component associated with a distance between the UE and the base station. The operations of 2015 may be performed in accordance with examples as disclosed herein. In some examples, aspects of the operations of 2015 may be performed by a spectral efficiency estimator 1035 as described with reference to FIG. 10.

At 2020, the method may include transmitting, to the base station, a report indicating a precoder of the set of precoders, the precoder selected based on calculating the spectral efficiency. The operations of 2020 may be performed in accordance with examples as disclosed herein. In some examples, aspects of the operations of 2020 may be performed by a precoder manager 1040 as described with reference to FIG. 10.

At 2025, the method may include receiving, from the base station, a message precoded using the precoder indicated by the report. The operations of 2025 may be performed in accordance with examples as disclosed herein. In some examples, aspects of the operations of 2025 may be performed by a LOS MIMO Manager 1050 as described with reference to FIG. 10.

Figure 21:
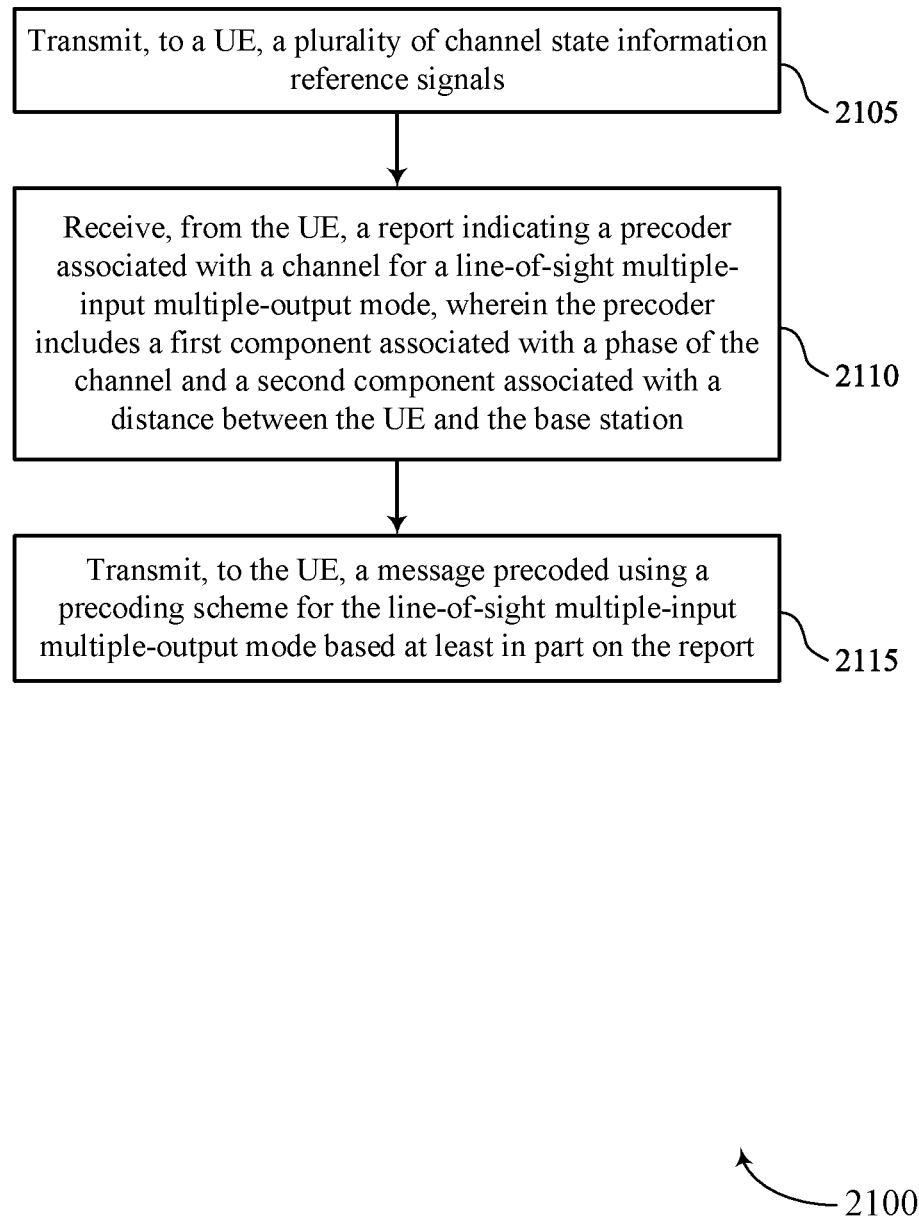

FIG. 21 shows a flowchart illustrating a method 2100 that supports codebook design for closed loop operation in accordance with aspects of the present disclosure. The operations of the method 2100 may be implemented by a base station or its components as described herein. For example, the operations of the method 2100 may be performed by a base station 105 as described with reference to FIGS. 1 through 7 and 12 through 15. In some examples, a base station may execute one or more instructions to control the functional elements of the base station to perform the described functions. Additionally or alternatively, the base station may perform aspects of the described functions using special-purpose hardware.

At 2105, the method may include transmitting, to a UE, a set of multiple channel state information reference signals. The operations of 2105 may be performed in accordance with examples as disclosed herein. In some examples, aspects of the operations of 2105 may be performed by a reference signal transmitter 1425 as described with reference to FIG. 14.

At 2110, the method may include receiving, from the UE, a report indicating a precoder associated with a channel for a line-of-sight multiple-input multiple-output mode, where the precoder includes a first component associated with a phase of the channel and a second component associated with a distance between the UE and the base station. The operations of 2110 may be performed in accordance with examples as disclosed herein. In some examples, aspects of the operations of 2110 may be performed by a precoder manager 1430 as described with reference to FIG. 14.

At 2115, the method may include transmitting, to the UE, a message precoded using a precoding scheme for the line-of-sight multiple-input multiple-output mode based on the report. The operations of 2115 may be performed in accordance with examples as disclosed herein. In some examples, aspects of the operations of 2115 may be performed by a LOS MIMO manager 1435 as described with reference to FIG. 14.

Figure 22:
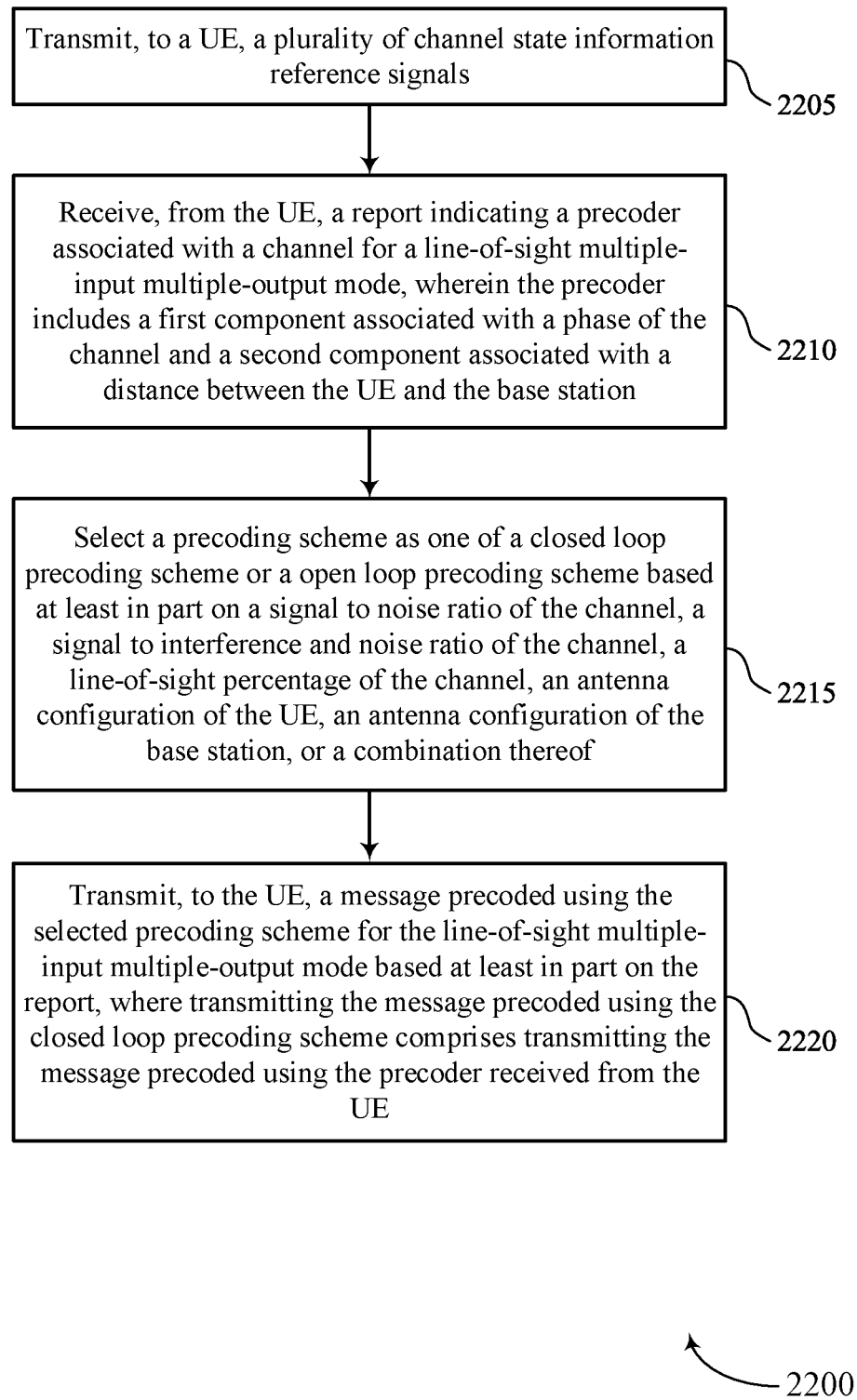

FIG. 22 shows a flowchart illustrating a method 2200 that supports codebook design for closed loop operation in accordance with aspects of the present disclosure. The operations of the method 2200 may be implemented by a base station or its components as described herein. For example, the operations of the method 2200 may be performed by a base station 105 as described with reference to FIGS. 1 through 7 and 12 through 15. In some examples, a base station may execute one or more instructions to control the functional elements of the base station to perform the described functions. Additionally or alternatively, the base station may perform aspects of the described functions using special-purpose hardware.

At 2205, the method may include transmitting, to a UE, a set of multiple channel state information reference signals. The operations of 2205 may be performed in accordance with examples as disclosed herein. In some examples, aspects of the operations of 2205 may be performed by a reference signal transmitter 1425 as described with reference to FIG. 14.

At 2210, the method may include receiving, from the UE, a report indicating a precoder associated with a channel for a line-of-sight multiple-input multiple-output mode, where the precoder includes a first component associated with a phase of the channel and a second component associated with a distance between the UE and the base station. The operations of 2210 may be performed in accordance with examples as disclosed herein. In some examples, aspects of the operations of 2210 may be performed by a precoder manager 1430 as described with reference to FIG. 14.

At 2215, the method may include selecting a precoding scheme as one of a closed loop precoding scheme or an open loop precoding scheme based on a signal to noise ratio of the channel, a signal to interference and noise ratio of the channel, a line-of-sight percentage of the channel, an antenna configuration of the UE, an antenna configuration of the base station, or a combination thereof. The operations of 2215 may be performed in accordance with examples as disclosed herein. In some examples, aspects of the operations of 2215 may be performed by a precoder manager 1430 as described with reference to FIG. 14.

At 2220, the method may include transmitting, to the UE, a message precoded using the selected precoding scheme for the line-of-sight multiple-input multiple-output mode based on the report, where transmitting the message precoded using the closed loop precoding scheme comprises transmitting the message precoded using the precoder received from the UE. The operations of 2220 may be performed in accordance with examples as disclosed herein. In some examples, aspects of the operations of 2220 may be performed by a LOS MIMO manager 1435 as described with reference to FIG. 14.

The following provides an overview of aspects of the present disclosure:

Aspect 1: A method for wireless communications at a UE, comprising: receiving, from a network entity, a plurality of channel state information reference signals; estimating a channel based at least in part on the plurality of channel state information reference signals; calculating a spectral efficiency for one or more precoders of a set of precoders associated with the channel for a line-of-sight multiple-input multiple-output mode, wherein the one or more precoders of the set of precoders include a first component associated with an estimated phase of the channel and a second component associated with a distance between the UE and the network entity; and transmitting, to the network entity, a report indicating a precoder of the set of precoders, the precoder selected based at least in part on calculating the spectral efficiency.

Aspect 2: The method of aspect 1, further comprising: selecting the precoder from the set of precoders based at least in part on a distance interval associated with the distance between the UE and the network entity, wherein each precoder of the set of precoders is associated with a respective distance interval, a respective rank, a respective number of antenna ports at the UE, or a combination thereof.

Aspect 3: The method of any of aspects 1 through 2, further comprising: estimating the estimated phase of the channel associated with the first component based at least in part on the distance between the UE and the network entity, a wavelength of the channel, an antenna configuration of the UE, an antenna configuration of the network entity, or a combination thereof.

Aspect 4: The method of aspect 3, further comprising: receiving, from the network entity, an indication of the antenna configuration of the network entity.

Aspect 5: The method of any of aspects 1 through 4, further comprising: selecting the precoder of the set of precoders, wherein the selected precoder is associated with a highest calculated spectral efficiency.

Aspect 6: The method of any of aspects 1 through 5, wherein the second component comprises one of a Slepian sequence or a Hermite-Gaussian polynomial.

Aspect 7: The method of any of aspects 1 through 6, further comprising: receiving, from the network entity, an indication to initiate the line-of-sight multiple-input multiple-output mode, wherein calculating the spectral efficiency for each precoder of the set of precoders associated with the channel for the line-of-sight multiple-input multiple-output mode is based at least in part on the indication to initiate the line-of-sight multiple-input multiple-output mode.

Aspect 8: The method of any of aspects 1 through 7, further comprising: transmitting, to the network entity, an indication of an antenna configuration of the UE.

Aspect 9: The method of any of aspects 1 through 8, further comprising: receiving, from the network entity, an indication of the set of precoders for the line-of-sight multiple-input multiple-output mode.

Aspect 10: The method of any of aspects 1 through 9, further comprising: transmitting, to the network entity, an indication of the distance between the UE and the network entity.

Aspect 11: The method of aspect 10, further comprising: receiving, from the network entity, one or more positioning reference signals, wherein the indication of the distance between the UE and the network entity is based at least in part on the one or more positioning reference signals.

Aspect 12: The method of any of aspects 1 through 11, further comprising: transmitting, to the network entity, a sounding reference signal indicating the distance between the UE and the network entity.

Aspect 13: The method of any of aspects 1 through 12, further comprising: receiving, from the network entity, a message precoded using the precoder indicated by the report.

Aspect 14: A method for wireless communications at a network entity, comprising: transmitting, to a UE, a plurality of channel state information reference signals; receiving, from the UE, a report indicating a precoder associated with a channel for a line-of-sight multiple-input multiple-output mode, wherein the precoder includes a first component associated with a phase of the channel and a second component associated with a distance between the UE and the network entity; and transmitting, to the UE, a message precoded using a precoding scheme for the line-of-sight multiple-input multiple-output mode based at least in part on the report.

Aspect 15: The method of aspect 14, further comprising: selecting the precoding scheme as one of a closed loop precoding scheme or an open loop precoding scheme based at least in part on a signal to noise ratio of the channel, a signal to interference and noise ratio of the channel, a line-of-sight percentage of the channel, an antenna configuration of the UE, an antenna configuration of the network entity, or a combination thereof.

Aspect 16: The method of aspect 15, wherein transmitting the message precoded using the closed loop precoding scheme comprises: transmitting the message precoded using the precoder received from the UE.

Aspect 17: The method of any of aspects 15 through 16, further comprising: estimating the line-of-sight percentage of the channel; and selecting the precoding scheme as the closed loop precoding scheme based at least in part on the line-of-sight percentage of the channel.

Aspect 18: The method of any of aspects 15 through 17, further comprising: estimating the signal to noise ratio of the channel or the signal to interference and noise ratio of the channel; and selecting the precoding scheme as the closed loop precoding scheme based at least in part on the signal to noise ratio of the channel or the signal to interference and noise ratio of the channel.

Aspect 19: The method of any of aspects 15 through 18, further comprising: receiving, from the UE, an indication of the antenna configuration of the UE; and selecting the precoding scheme as the closed loop precoding scheme based at least in part on the indication of the antenna configuration of the UE.

Aspect 20: The method of any of aspects 14 through 19, further comprising: receiving, from the UE, an indication of the distance between the UE and the network entity.

Aspect 21: The method of aspect 20, further comprising: transmitting, to the UE, one or more positioning reference signals, wherein the indication of the distance between the UE and the network entity is based at least in part on the one or more positioning reference signals.

Aspect 22: The method of any of aspects 14 through 21, further comprising: receiving, from the UE, a sounding reference signal indicating the distance between the UE and the network entity.

Aspect 23: The method of any of aspects 14 through 22, wherein the second component comprises one of a Slepian sequence or a Hermite-Gaussian polynomial.

Aspect 24: An apparatus for wireless communications at a UE, comprising a processor; memory coupled with the processor; and one or more instructions stored in the memory and executable by the processor to cause the apparatus to, based at least in part on the one or more instructions, perform a method of any of aspects 1 through 13.

Aspect 25: An apparatus for wireless communications at a UE, comprising at least one means for performing a method of any of aspects 1 through 13.

Aspect 26: A non-transitory computer-readable medium storing code for wireless communications at a UE, the code comprising instructions executable by a processor to perform a method of any of aspects 1 through 13.

Aspect 27: An apparatus for wireless communications at a network entity, comprising a processor; memory coupled with the processor; and one or more instructions stored in the memory and executable by the processor to cause the apparatus to, based at least in part on the one or more instructions, perform a method of any of aspects 14 through 23.

Aspect 28: An apparatus for wireless communications at a network entity, comprising at least one means for performing a method of any of aspects 14 through 23.

Aspect 29: A non-transitory computer-readable medium storing code for wireless communications at a network entity, the code comprising instructions executable by a processor to perform a method of any of aspects 14 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
receiving, from a network entity, a plurality of channel state information reference signals;
estimating a channel based at least in part on the plurality of channel state information reference signals;
calculating a spectral efficiency for one or more precoders of a set of precoders associated with the channel for a line-of-sight multiple-input multiple-output mode, wherein the one or more precoders of the set of precoders include a first component associated with an estimated phase of the channel and a second component associated with a distance between the UE and the network entity; and
transmitting, to the network entity, a report indicating a precoder of the set of precoders, the precoder selected based at least in part on calculating the spectral efficiency.

2. The method of claim 1, further comprising:
selecting the precoder from the set of precoders based at least in part on a distance interval associated with the distance between the UE and the network entity, wherein each precoder of the set of precoders is associated with a respective distance interval, a respective rank, a respective number of antenna ports at the UE, or a combination thereof.

3. The method of claim 1, further comprising:
estimating the estimated phase of the channel associated with the first component based at least in part on the distance between the UE and the network entity, a wavelength of the channel, an antenna configuration of the UE, an antenna configuration of the network entity, or a combination thereof.

4. The method of claim 3, further comprising:
receiving, from the network entity, an indication of the antenna configuration of the network entity.

5. The method of claim 1, further comprising:
selecting the precoder of the set of precoders, wherein the selected precoder is associated with a highest calculated spectral efficiency.

6. The method of claim 1, wherein the second component comprises one of a Slepian sequence or a Hermite-Gaussian polynomial.

7. The method of claim 1, further comprising:
receiving, from the network entity, an indication to initiate the line-of-sight multiple-input multiple-output mode, wherein calculating the spectral efficiency for each precoder of the set of precoders associated with the channel for the line-of-sight multiple-input multiple-output mode is based at least in part on the indication to initiate the line-of-sight multiple-input multiple-output mode.

8. The method of claim 1, further comprising:
transmitting, to the network entity, an indication of an antenna configuration of the UE.

9. The method of claim 1, further comprising:
receiving, from the network entity, an indication of the set of precoders for the line-of-sight multiple-input multiple-output mode.

10. The method of claim 1, further comprising:
transmitting, to the network entity, an indication of the distance between the UE and the network entity.

11. The method of claim 10, further comprising:
receiving, from the network entity, one or more positioning reference signals, wherein the indication of the distance between the UE and the network entity is based at least in part on the one or more positioning reference signals.

12. The method of claim 1, further comprising:
transmitting, to the network entity, a sounding reference signal indicating the distance between the UE and the network entity.

13. The method of claim 1, further comprising:
receiving, from the network entity, a message precoded using the precoder indicated by the report.

14. A method for wireless communications at a network entity, comprising:
transmitting, to a user equipment (UE), a plurality of channel state information reference signals;
receiving, from the UE, a report indicating a precoder associated with a channel for a line-of-sight multiple-input multiple-output mode, wherein the precoder includes a first component associated with a phase of the channel and a second component associated with a distance between the UE and the network entity; and
transmitting, to the UE, a message precoded using a precoding scheme for the line-of-sight multiple-input multiple-output mode based at least in part on the report.

15. The method of claim 14, further comprising:
selecting the precoding scheme as one of a closed loop precoding scheme or an open loop precoding scheme based at least in part on a signal to noise ratio of the channel, a signal to interference and noise ratio of the channel, a line-of-sight percentage of the channel, an antenna configuration of the UE, an antenna configuration of the network entity, or a combination thereof.

16. The method of claim 15, wherein transmitting the message precoded using the closed loop precoding scheme comprises:
transmitting the message precoded using the precoder received from the UE.

17. The method of claim 15, further comprising:
estimating the line-of-sight percentage of the channel; and
selecting the precoding scheme as the closed loop precoding scheme based at least in part on the line-of-sight percentage of the channel.

18. The method of claim 15, further comprising:
estimating the signal to noise ratio of the channel or the signal to interference and noise ratio of the channel; and
selecting the precoding scheme as the closed loop precoding scheme based at least in part on the signal to noise ratio of the channel or the signal to interference and noise ratio of the channel.

19. The method of claim 15, further comprising:
receiving, from the UE, an indication of the antenna configuration of the UE; and selecting the precoding scheme as the closed loop precoding scheme based at least in part on the indication of the antenna configuration of the UE.

20. The method of claim 14, further comprising:
receiving, from the UE, an indication of the distance between the UE and the network entity.

21. The method of claim 20, further comprising:
transmitting, to the UE, one or more positioning reference signals, wherein the indication of the distance between the UE and the network entity is based at least in part on the one or more positioning reference signals.

22. The method of claim 14, further comprising:
receiving, from the UE, a sounding reference signal indicating the distance between the UE and the network entity.

23. The method of claim 14, wherein the second component comprises one of a Slepian sequence or a Hermite-Gaussian polynomial.

24. An apparatus for wireless communications at a user equipment (UE), comprising:
a processor;
memory coupled with the processor; and
one or more instructions stored in the memory and executable by the processor to cause the apparatus to, based at least in part on the one or more instructions:
receive, from a network entity, a plurality of channel state information reference signals;
estimate a channel based at least in part on the plurality of channel state information reference signals;
calculate a spectral efficiency for one or more precoders of a set of precoders associated with the channel for a line-of-sight multiple-input multiple-output mode, wherein the one or more precoders of the set of precoders include a first component associated with an estimated phase of the channel and a second component associated with a distance between the UE and the network entity; and
transmit, to the network entity, a report indicating a precoder of the set of precoders, the precoder selected based at least in part on calculating the spectral efficiency.

25. The apparatus of claim 24, wherein the one or more instructions are further executable by the processor to cause the apparatus to, based at least in part on the one or more instructions:
select the precoder from the set of precoders based at least in part on a distance interval associated with the distance between the UE and the network entity, wherein each precoder of the set of precoders is associated with a respective distance interval, a respective rank, a respective number of antenna ports at the UE, or a combination thereof.

26. The apparatus of claim 24, wherein the one or more instructions are further executable by the processor to cause the apparatus to, based at least in part on the one or more instructions:
estimate the estimated phase of the channel associated with the first component based at least in part on the distance between the UE and the network entity, a wavelength of the channel, an antenna configuration of the UE, an antenna configuration of the network entity, or a combination thereof.

27. The apparatus of claim 26, wherein the one or more instructions are further executable by the processor to cause the apparatus to, based at least in part on the one or more instructions:

receive, from the network entity, an indication of the antenna configuration of the network entity.

28. The apparatus of claim 24, wherein the one or more instructions are further executable by the processor to cause the apparatus to, based at least in part on the one or more instructions:

select the precoder of the set of precoders, wherein the selected precoder is associated with a highest calculated spectral efficiency.

29. An apparatus for wireless communications at a network entity, comprising:

a processor;

memory coupled with the processor; and one or more instructions stored in the memory and executable by the processor to cause the apparatus to, based at least in part on the one or more instructions:

transmit, to a user equipment (UE), a plurality of channel state information reference signals;

receive, from the UE, a report indicating a precoder associated with a channel for a line-of-sight multiple-input multiple-output mode, wherein the precoder includes a first component associated with a phase of the channel and a second component associated with a distance between the UE and the network entity; and transmit, to the UE, a message precoded using a precoding scheme for the line-of-sight multiple-input multiple-output mode based at least in part on the report.

30. The apparatus of claim 29, wherein the one or more instructions are further executable by the processor to cause the apparatus to, based at least in part on the one or more instructions:

select the precoding scheme as one of a closed loop precoding scheme or an open loop precoding scheme based at least in part on a signal to noise ratio of the channel, a signal to interference and noise ratio of the channel, a line-of-sight percentage of the channel, an antenna configuration of the UE, an antenna configuration of the network entity, or a combination thereof.

* * * * *